(12) United States Patent
Mikhael et al.

(10) Patent No.: US 10,192,142 B2
(45) Date of Patent: Jan. 29, 2019

(54) SUPERVISED FACIAL RECOGNITION SYSTEM AND METHOD

(71) Applicant: University of Central Florida Research Foundation, Inc., Orlando, FL (US)

(72) Inventors: Wasfy Mikhael, Winter Springs, FL (US); Ahmed Aldhahab, Oviedo, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 12 days.

(21) Appl. No.: 15/204,493

(22) Filed: Jul. 7, 2016

(65) Prior Publication Data

US 2017/0011257 A1 Jan. 12, 2017

Related U.S. Application Data

(60) Provisional application No. 62/189,998, filed on Jul. 8, 2015.

(51) Int. Cl.
*G06K 9/00* (2006.01)
*G06K 9/62* (2006.01)
*G06K 9/52* (2006.01)
*G06K 9/46* (2006.01)
*G06K 9/66* (2006.01)

(52) U.S. Cl.
CPC .......... *G06K 9/6214* (2013.01); *G06K 9/527* (2013.01); *G06K 9/00248* (2013.01); *G06K 9/00288* (2013.01); *G06K 9/4642* (2013.01); *G06K 9/624* (2013.01); *G06K 9/66* (2013.01)

(58) Field of Classification Search
CPC ........ G06T 2207/20064; G06K 9/4642; G06K 9/00248; G06K 9/00288; G06K 9/527; G06K 9/6214; G06K 9/624; G06K 9/66
USPC ......................................................... 382/118
See application file for complete search history.

(56) References Cited

PUBLICATIONS

Alfaouri, et al. (Novel Techniques for Face Recognition Identification and Labeling), Medwell Journals, pp. 216-224, 2007.*

(Continued)

*Primary Examiner* — Daniel G Mariam
(74) *Attorney, Agent, or Firm* — Stephen C. Thomas; Courtney M. Dunn

(57) ABSTRACT

A computer executed method for supervised facial recognition comprising the operations of preprocessing, feature extraction and recognition. Preprocessing may comprise dividing received face images into several subimages, converting the different face image (or subimage) dimensions into a common dimension and/or converting the datatypes of all of the face images (or subimages) into an appropriate datatype. In feature extraction, 2D DMWT is used to extract information from the face images. Application of the 2D DMWT may be followed by FastICA. FastICA, or, in cases where FastICA is not used, 2D DMWT, may be followed by application of the $l_2$-norm and/or eigendecomposition to obtain discriminating and independent features. The resulting independent features are fed into the recognition phase, which may use a neural network, to identify an unknown face image.

38 Claims, 20 Drawing Sheets

(56) References Cited

PUBLICATIONS

Gaidhane, et al. (An efficient approach for face recognition based on common eigenvalues), Pattern Recognition, pp. 1869-1879, 2013.*
Y. Liu, G. Chen, J. Lu, and W. Chen., "Face Recognition Based on Independent Component Analysis and Fuzzy Support Vector Machine," IEEE 6th WCICA, Dalian China, vol. 2, pp. 9889-9892, Jun. 2006.
Z. Lihong, S. Ying, Z. Yushi, Z. Cheng, and Z. Xili, "Face Recognition Based on Image Transformation," IEEE GCIS, Xiamen China, vol. 04, pp. 418-421, May 2009.
K. S. Kinage and S. G. Bhirud, "Face Recognition Based on Independent Component Analysis on Wavelet Subband," IEEE 3rd ICCSIT, Chengdu China, vol. 9, pp. 436-440, Jul. 2010.
Y. Hongtao, Q. Jiaqing, and F. Ping, "Face Recognition with Discrete Cosine Transform," IEEE 2nd IMCCC, Harbin China, pp. 802-805, Dec. 2012.
P. V. N. Reddy and K. Prasad, "Multiwavelet Based Texture Features for Content Based Image Retrieval," International Journal of Computer Science and Technology, vol. 2, Issue 1, Mar. 2011, pp. 141-145.
M. Li, F. Wu, and X. Liu., "Face Recognition Based on WT, FastICA and RBF Neural Network," ISSS 3rd ICNC, Aug. 2007.
P. C. Yuen, and J.H. Lai., "Face Representation Using Independent Component Analysis," The Journal of Pattern Recognition Society, vol. 35 pp. 1247-1257, 2002.
J. Geronimo, D. Hardian, and P. Massopust, "Fractal Functions and Wavelet Expansions Based on several Scaling Functions," Journal of Approximation Theory, vol. 78, Sep. 1994, pp. 373-401.
V. Strela and A. Walden, "Orthogonal and Biorthogonal Multiwavelets for Signal Denoising and Image Compression," Proceedings of SPIE, Issue 1, Nov. 1998, pp. 96-107.
V. Strela, P. Heller, G. Strang, P. Topiwala, and C. Heil, "The Application of Multiwavelet Filterbanks to Image Processing," IEEE Tran. on Image Processing, vol. 8, No. 4, Apr. 1999, pp. 548-563.
P. Comon, "Independent Component Analysis, A new Concept?," El-sevier Journal of Signal Processing, vol. 36, Issue 3, Apr. 1994, pp. 287-314.
A. J. Bell and T. J. Sejnowski, "An Information-Maximization approach to blind separation and blind deconvolution," Elsevier Journal of Neural Computation, vol. 7, Issue 6, Nov. 1995, pp. 1129-1159.
A. Hyvarinen, "Fast and Robust Fixed-Point Algorithms for Independent Component Analysis, "IEEE Tran. on Neural Network, vol. 10, Issue 3, May 1999, pp. 626-634.
M.S. Bartlett, J.R. Movellan, and T.J. Sejnowaski, "Face Recognition by Independent Component Analysis," IEEE Tran. on Neural Networks, vol. 13, Issue 6, Nov. 2002, pp. 1450-1464.

* cited by examiner

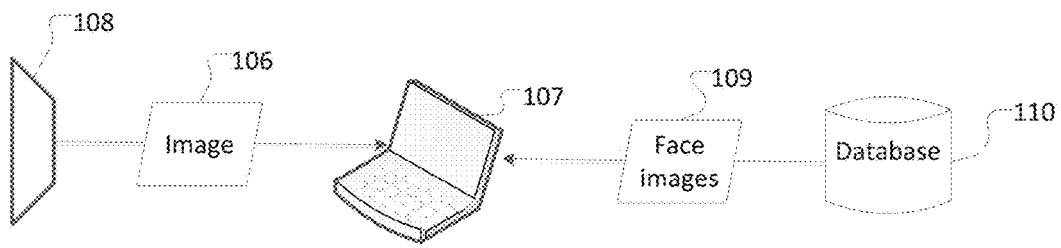
*FIG. 1A*
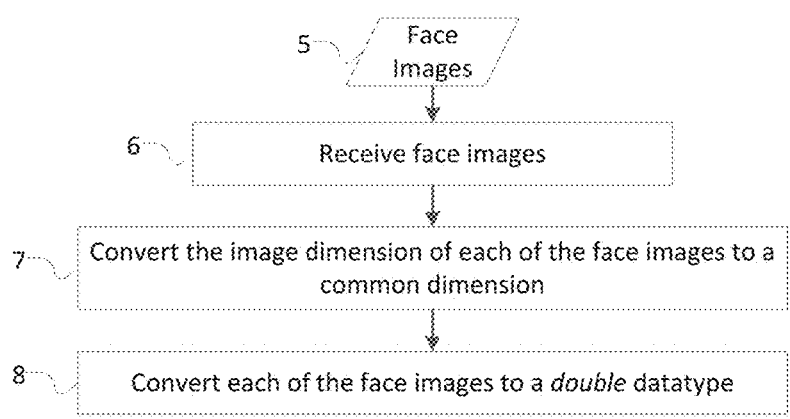
*FIG. 1B*
| Databases | ORL | YALE | FERET | New (Common) |
|---|---|---|---|---|
| Dimensions | 112 x 92 (M x R) | 243 x 320 (I x J) | 384 x 256 (K x L) | 128 x 128 (N x N) |
*FIG. 2*

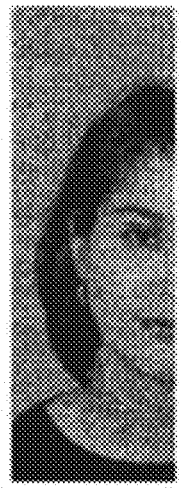
FIG. 9A
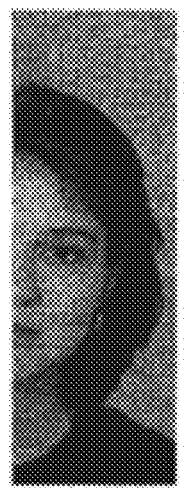
FIG. 9B
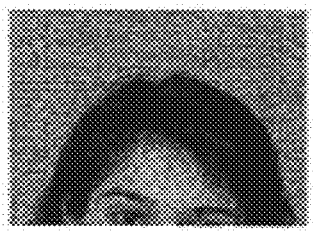
FIG. 9C
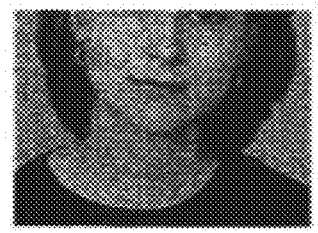
FIG. 9D
| | Input Face Images | Subimage_1 Horizontal | Subimage_2 Horizontal | Subimage_3 Vertical | Subimage_4 Vertical | New (Common) |
|---|---|---|---|---|---|---|
| Dimensions | MxR | M/2xR | M/2xR | MxR/2 | MxR/2 | NxN |
FIG. 10

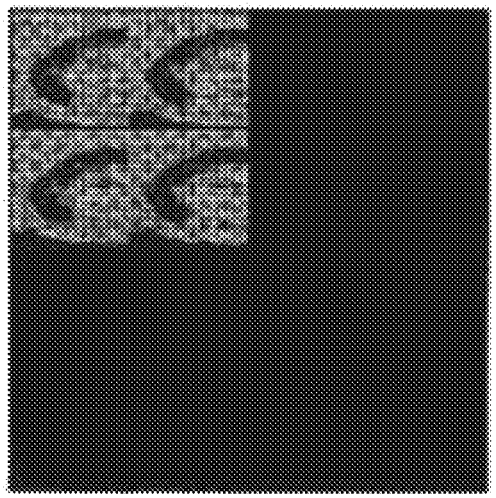
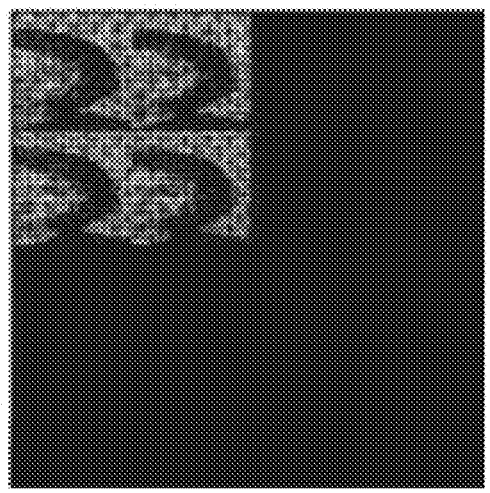
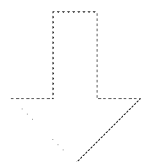
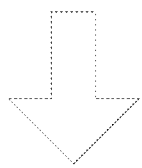
$N^2/16$
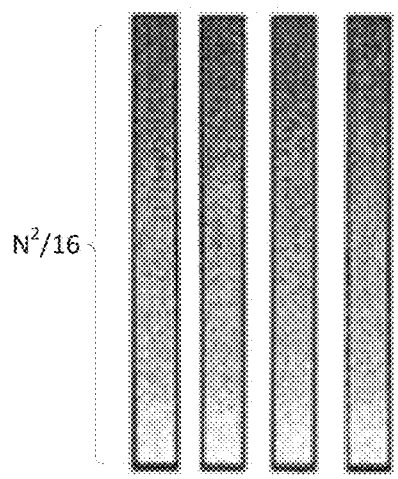
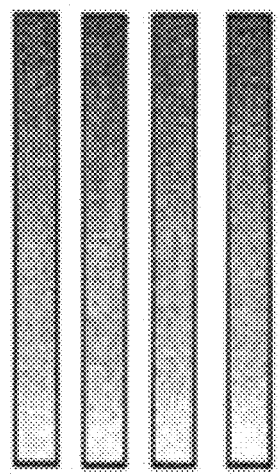
*FIG. 13A*                *FIG. 13B*

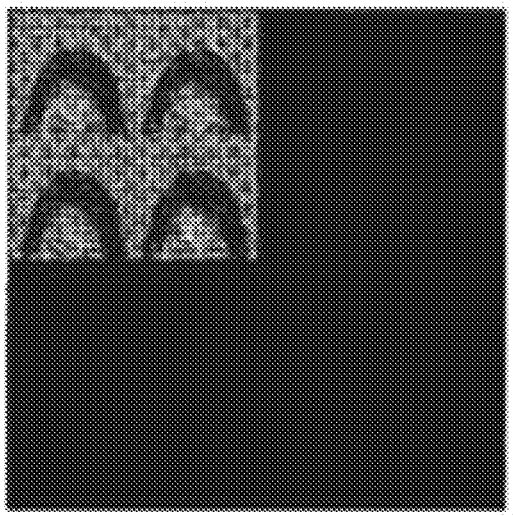
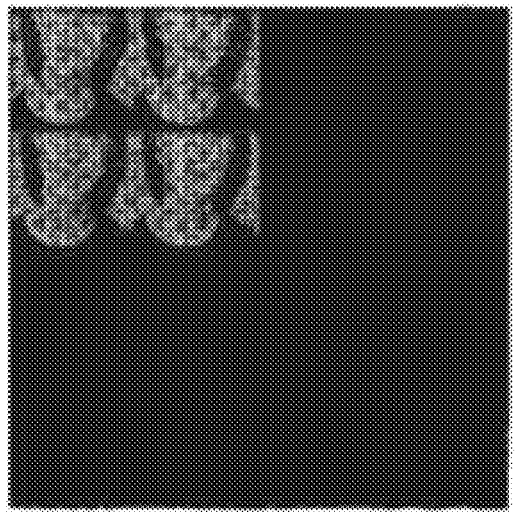
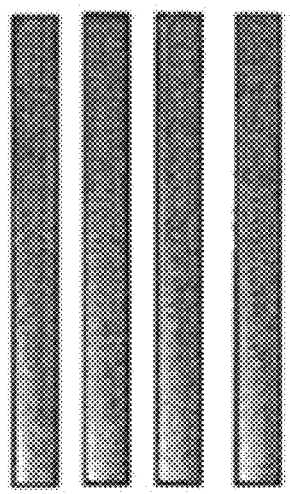
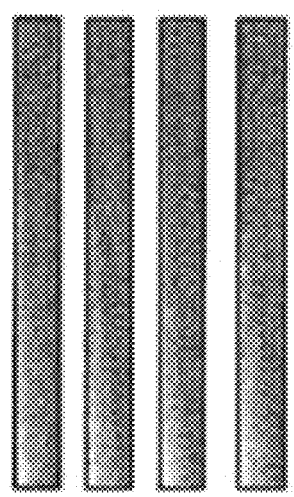
FIG. 13C
FIG. 13D

| No. of poses used in training mode | No. of poses used in testing mode | Recognition rate for training mode | Recognition rate for testing mode | | | | | | | | | |
|---|---|---|---|---|---|---|---|---|---|---|---|---|
| | | | Method 10 | Method 30 | Method 40 | Method 55 | Method 70 (using FastICA signal matrix) | Method 70 (using feature matrix or mixing matrix) | Method 85 | Method 90 (using FastICA signal matrix) | Method 90 (using feature matrix or mixing matrix) | Method 105 |
| P=1 | 9 | 100% | 78.05% | 83.61% | 86.94% | 90.56% | 85.28% | 85% | 82.5% | 91.1% | 88.06% | 84.7% |
| P=3 | 7 | 100% | 89.64% | 92.5% | 93.57% | 96.07% | 93.22% | 91.43% | 89.3% | 95.36% | 93.93% | 91.1% |
| P=5 | 5 | 100% | 96% | 97.5% | 98% | 99% | 99.5% | 99.5% | 98.5% | 100% | 99.5% | 99% |
| Size of the resultant matrix | | | $N \times 1$ | $\frac{N}{4} \times \frac{N}{4}$ | $N \times 1$ | $\frac{N}{4} \times \frac{N}{4}$ | $\frac{N}{4} \times \frac{N}{4}$ | $\frac{N}{4} \times \frac{N}{4}$ | $\frac{N}{4} \times \frac{N}{4}$ | $\frac{N^2}{16} \times 4$ | $\frac{N^2}{16} \times 4$ | $\frac{N^2}{16} \times 4$ |

FIG. 15

| No. of poses used in training mode | No. of poses used in testing mode | Recognition rate for training mode | Recognition rate for testing mode | | | | | | | | |
|---|---|---|---|---|---|---|---|---|---|---|---|
| | | | Method 10 | Method 30 | Method 40 | Method 55 | Method 70 (using FastICA signal matrix) | Method 70 (using feature matrix or mixing matrix) | Method 85 | Method 90 (using FastICA signal matrix) | Method 90 (using feature matrix or mixing matrix) | Method 105 |
| P=1 | 10 | 100% | 80.67% | 87.33% | 84% | 89.33% | 82.67% | 80.67% | 78.67% | 86% | 84% | 81.33% |
| P=3 | 8 | 100% | 85.83% | 91.67% | 90.83% | 94.17% | 94.17% | 92.5% | 90% | 96.67% | 95% | 94.17% |
| P=5 | 6 | 100% | 93.33% | 95.56% | 96.67% | 97.78% | 100% | 98.89% | 97.78% | 100% | 100% | 98.89% |
| Size of the resultant matrix | | | $N \times 1$ | $\frac{N}{4} \times \frac{N}{4}$ | $N \times 1$ | $\frac{N}{4} \times \frac{N}{4}$ | $\frac{N}{4} \times \frac{N}{4}$ | $\frac{N}{4} \times \frac{N}{4}$ | $\frac{N}{4} \times \frac{N}{4}$ | $\frac{N^2}{16} \times 4$ | $\frac{N^2}{16} \times 4$ | $\frac{N^2}{16} \times 4$ |

FIG. 16

| No. of poses used in training mode | No. of poses used in testing mode | Recognition rate for training mode | Recognition rate for testing mode | | | | | | | | | |
|---|---|---|---|---|---|---|---|---|---|---|---|---|
| | | | Method 10 | Method 30 | Method 40 | Method 55 | Method 70 (using FastICA signal matrix) | Method 70 (using feature matrix or mixing matrix) | Method 85 | Method 90 (using FastICA signal matrix) | Method 90 (using feature matrix or mixing matrix) | Method 105 |
| P=1 | 10 | 100% | 79.8% | 82.65% | 83.05% | 89.9% | 81.75% | 81.25% | 79% | 84.55% | 83.5% | 82.5% |
| P=3 | 8 | 100% | 89.75% | 92.56% | 93.31% | 94.81% | 93.1% | 92.38% | 91.3% | 94.8% | 93.8% | 93% |
| P=5 | 6 | 100% | 96.08% | 97.25% | 97.75% | 98.58% | 99.16% | 98.42% | 98% | 99.75% | 99.58% | 99.08% |
| Size of the resultant matrix | | | $N \times 1$ | $\frac{N}{4} \times \frac{N}{4}$ | $N \times 1$ | $\frac{N}{4} \times \frac{N}{4}$ | $\frac{N}{4} \times \frac{N}{4}$ | $\frac{N}{4} \times \frac{N}{4}$ | $\frac{N}{4} \times \frac{N}{4}$ | $\frac{N^2}{16} \times 4$ | $\frac{N^2}{16} \times 4$ | $\frac{N^2}{16} \times 4$ |

*FIG. 17*

SUPERVISED FACIAL RECOGNITION SYSTEM AND METHOD

CROSS REFERENCE TO RELATED APPLICATIONS

This application claims priority to U.S. Provisional Patent Application Ser. No. 62/189,998, filed Jul. 8, 2015, entitled "Supervised Facial Recognition System and Method", which is hereby incorporated by reference herein in its entirety.

FIELD OF INVENTION

The present disclosure generally relates to biometric recognition systems; more specifically, to supervised learning facial recognition using multiresolution and independent features.

BACKGROUND

Designing an efficient facial recognition system is a challenging task that has received renewed attention in recent years due to its wide applicability in security, control and biomedical applications. The quality of a recognition system depends on several factors such as the computational complexity, the recognition rate and the storage requirements.

A large number of methods have been proposed for facial recognition. Facial recognition based on Two-Dimensional Independent Component Analysis (2D ICA) and Fuzzy Supported Vector Machine (FSVM) was proposed in Y. Liu et al. Y. Liu et al., "Face Recognition Based on Independent Component Analysis and Fuzzy Support Vector Machine," IEEE 6th World Congress on Intelligent Control and Automation, Dalian China, Vol. 2, pp 9889-9892, June 2006. There, the extracted features were obtained by applying 2D ICA to the low-frequency band of different levels of Two-Dimensional Discrete Wavelet Transform (2D DWT) based on Daubechies 4. Then, the extracted features were fed to FSVM for classification. The method was tested on the ORL and YALE databases.

In M. Li et al., 2D DWT, 2D ICA and Radial Basis Function (RBF) were used for facial recognition. M. Li et al., "Face Recognition Based on WT, FastICA and RBF Neural Network," IEEE 3rd ICNC, Haikou China, Vol. 02, pp. 3-7, August 2007. The 2D DWT based on Daubechies 4 was used to extract the useful information from the face images and then 2D ICA was used to get discriminating and independent features. Then, the extracted features were fed to a RBF for the recognition task. The method was tested on the ORL database and produced a recognition rate of 93%.

Three different methods based on Wavelet, Fourier, and Discrete Cosine (DCT) transforms for facial recognition were studied in Z. Lihong et al. "Face Recognition Based on Image Transformation," IEEE GCIS, Xiamen China, Vol. 04, pp. 418-421, May 2009. Each transform was applied individually to find the features. Nearest-neighbor classifiers using two similarity criteria, Euclidean distance and correlation coefficients, were used for the recognition task. Each transform was tested on the ORL and YALE databases and the highest recognition rates achieved were 97% and 94.5% for the ORL and YALE databases, respectively.

Multiresolution analysis based on Independent Component Analysis (ICA) was proposed in K. S. Kinage et al. K. S. Kinage et al., "Face Recognition Based on Independent Component Analysis on Wavelet Subband," IEEE 3rd ICCSIT, Chengdu China, Vol. 9, pp. 436-440, July 2010. There, various wavelet functions were applied to extract the features from the images by decomposing the face image into eight levels. Then, the extracted facial features were analyzed using 2D ICA and the Euclidean distance was used to measure accuracy. The method was tested on the ORL database and the recognition rate recorded was 91.5%.

In Y. Hongtao et al., DCT and SVM were used for facial recognition. Y. Hongtao et al., "Face Recognition with Discrete Cosine Transform," IEEE 2nd IMCCC, Harbin China, pp. 802-805, December 2012. The feature coefficients were extracted using DCT and then fed to SVM for recognition. The system was tested on the ORL database and produced a recognition rate of 95%.

Discrete Multiwavelet Transform (DWT) is broadly applied in computer vision, image processing, signal processing, and pattern recognition. In contrast to DWT, which uses one scaling function $\Phi(t)$ and one wavelet function $\Psi(t)$, Two-Dimensional Discrete Multiwavelet Transform (2D DMWT) is based on Multiresolution Analysis (MRA) and uses multiple scaling and wavelet functions. The scaling and wavelet functions are associated with low and high pass filters, respectively. In multiwavelets, the N scaling and wavelet functions can be expressed in vector form as:

$$\Phi(t) = [\phi_1(t), \phi_2(t), \ldots, \phi_N(t)]$$

$$\Psi(t) = [\psi_1(t), \psi_2(t), \ldots, \psi_N(t)]$$

where $\Phi(t)$ and $\Psi(t)$ are multi-scaling and wavelet functions, respectively. P. V. N. Reddy et al., "Multiwavelet Based Texture Features for Content Based Image Retrieval," International Journal of Computer Science and Technology, Vol. 2, Issue 1, March 2011, pp. 141-145. Note that N=1 corresponds to the standard wavelet transform. Akin to the scalar wavelet, it is possible to write the two-scale dilation and wavelet equations as:

$$\Phi(t) = \sqrt{2} \sum_{k=-\infty}^{\infty} H_k \cdot \Phi(2t - k)$$

$$\Psi(t) = \sqrt{2} \sum_{k=-\infty}^{\infty} G_k \cdot \Phi(2t - k),$$

where $H_k$ and $G_k$ are the N×N filter matrices for each integer k. In contrast to DWT, multiwavelets have several favorable features such as orthogonality, symmetry, compact support, and high order of approximation. These features provide more degrees of freedom compared to the wavelet transform, which cannot possess all these features at the same time.

Multiwavelets typically use a multiplicity N=2, in which case the scaling and wavelet functions can be written as $\Phi(t) = [\phi_1(t) \ \phi_2(t)]^T$ and $\Psi(t) = [\psi_1(t) \ \psi_2(t)]^T$, respectively. Here, the Gernimo, Hardin and Massopust (GHM) filter introduced by Gernimo et al. is used. Gernimo et al. "Fractal Functions and Wavelet Expansions Based on several Scaling Functions," Journal of Approximation Theory, vol. 78, September 1994, pp. 373-401. For the GHM case, the multi-scaling function $H_k$ has four scaling matrices $H_0$, $H_1$, $H_2$, and $H_3$ and also $G_k$ has four wavelet matrices $G_0$, $G_1$, $G_2$ and $G_3$ as shown below:

$$H_0 = \begin{bmatrix} \frac{3}{5\sqrt{2}} & \frac{2}{5} \\ \frac{-1}{20} & \frac{-2}{10\sqrt{2}} \end{bmatrix}, H_1 = \begin{bmatrix} \frac{3}{2\sqrt{2}} & 0 \\ \frac{9}{20} & \frac{1}{\sqrt{2}} \end{bmatrix}$$

$$H_2 = \begin{bmatrix} 0 & 0 \\ \frac{9}{20} & \frac{-3}{10\sqrt{2}} \end{bmatrix}, H_3 = \begin{bmatrix} 0 & 0 \\ \frac{-1}{20} & 0 \end{bmatrix}$$

$$G_0 = \begin{bmatrix} \frac{-1}{20} & \frac{-3}{10\sqrt{2}} \\ \frac{1}{10\sqrt{2}} & \frac{3}{10} \end{bmatrix}, G_1 = \begin{bmatrix} \frac{9}{20} & \frac{-1}{\sqrt{2}} \\ \frac{9}{20} & \frac{1}{\sqrt{2}} \end{bmatrix}$$

$$G_2 = \begin{bmatrix} \frac{9}{20} & \frac{-3}{10\sqrt{2}} \\ \frac{9}{10\sqrt{2}} & \frac{-3}{10} \end{bmatrix}, G_3 = \begin{bmatrix} \frac{-1}{20} & 0 \\ \frac{-1}{10\sqrt{2}} & 0 \end{bmatrix}$$

V. Strela and A Walden, "Orthogonal and Biorthogonal Multiwavelets for Signal Denoising and Image Compression," Proceedings of SPIE, Issue 1, November 1998, pp 96-107.

These matrices are used to construct the transformation matrix T which is used in the 2D DMWT to extract the useful information from the face images. The transformation matrix T can be written as $$T = \begin{bmatrix} H_0 & H_1 & H_2 & H_3 & 0 & 0 & \ldots \\ G_0 & G_1 & G_2 & G_3 & 0 & 0 & \ldots \\ 0 & 0 & H_0 & H_1 & H_2 & H_3 & \ldots \\ 0 & 0 & G_0 & G_1 & G_2 & G_3 & \ldots \\ \vdots & \vdots & \vdots & \vdots & \vdots & \vdots & \ldots \end{bmatrix}$$

Further details about 2D DMWT can be found in V. Strela and A. Walden and V. Strela et al. V. Strela et al., "The Application of Multiwavelet Filterbanks to Image Processing," IEEE Tran. On Image Processing, Vol. 8, No. 4, April 1999, pp. 548-563.

ICA is widely used to deal with problems similar to the cocktail-party problem. A. J. Bell et al., "An Information-Maximization approach to blind separation and blind deconvolution," Elsevier Journal of Neural Computation, Vol. 7, Issue 6, November 1995, pp. 1129-1159. Hence, it is extensively used for Blind Signal Separation (BSS). A. J. Bell et al.; A. Hyvarinen, "Fast and Robust Fixed-Point Algorithms for Independent Component Analysis," IEEE Tran. on Neural Network, Vol. 10, Issue 3, May 1999, pp. 626-634. However, one of the most attractive applications is in feature extraction, wherein ICA can be used to extract independent image bases that are not necessarily orthogonal. M. Li et al.

ICA is a statistical signal processing technique that is very sensitive to high order statistics. It can be considered as a generalization of Principal Component Analysis (PCA). The idea of ICA is to represent a set of random variables using basis functions such that the components are statistically independent or nearly independent. Consider observing M random variables $X_1, X_2, \ldots X_M$ with zero mean, which are assumed to be linear combinations of N mutually independent components $S_1, S_2, \ldots S_N$. Let the vector $X=[X_1, X_2, \ldots X_M]^T$ denote a M×1 vector of observed variables and $S=[s_1, s_2, \ldots s_N]^T$ an N×1 vector of mutually independent components. The relation between X and S is expressed as:

$$X = A \cdot S \quad (5)$$

where A is a full rank M×N unknown matrix, called the mixing matrix or the feature matrix. P. C. Yuen, et al., "Face Representation Using Independent Component Analysis," Elsevier Journal of The Pattern Recognition Society, Vol. 35, Issue 6, June 2002, pp. 1247-1257. In feature extraction, the columns of A are the features and the component $s_i$ is the coefficient of the $i^{th}$ feature in the data vector X.

Nevertheless, ICA has two main drawbacks. First, it typically requires complex matrix operations. P. Comon, "Independent Component Analysis, A new Concept?," Elsevier Journal of Signal Processing, Vol. 36, Issue 3, April 1994, pp. 287-314. Second, it has slow convergence. A. J. Bell et al. Therefore, A. Hyvarinen introduced a new method called FastICA. FastICA is computationally more efficient for estimating the ICA components and has a faster convergence rate by using a fixed point iteration method. Further detail about FastICA can be found in A. Hyvarinen and M. S. Bartlett et al. M. S. Bartlett, et al., "Face Recognition by Independent Component Analysis," IEEE Tran. on Neural Networks, Vol. 13, Issue 6, November 2002, pp. 1450-1464.

SUMMARY

In accordance with the teachings disclosed herein, embodiments related to methods and systems for supervised facial recognition using multiresolution and independent features are disclosed.

In an embodiment, a computer executed method for facial recognition comprises three phases—preprocessing, feature extraction and recognition. Preprocessing is performed after receipt of a face image. Preprocessing may comprise converting an image dimension of the face image to a common dimension, which may be of size N×N and in which N may be of the power two, and converting the face image from a first datatype to a second datatype, which may be the double datatype. After preprocessing, feature extraction begins. During feature extraction the 2D DMWT is applied to the preprocessed face image to obtain a resultant image matrix for the face image. The resultant image matrix has a plurality of subimages, which may be four subimages. Each subimage is then converted into a vector thereby creating a vector corresponding with each subimage. The vectors for each subimage are then combined to create a feature matrix. 2D FastICA is applied to the feature matrix to obtain a plurality of independent subimages and the independent subimages are then converted into two-dimensional form. The plurality of two-dimensional independent subimages are used to determine a resultant feature vector. Recognition of the resultant feature vector is then performed, which may be done using a neural network.

The resultant feature vector may be determined using eigenvalues. To do this, an eigenvalue is determined for each of the independent subimages and then the eigenvalues are combined to obtain a resultant feature matrix. The resultant feature matrix is then converted to a resultant feature vector.

Alternatively, the resultant feature vector may be determined using eigenvectors. To do this, an eigenvector is determined for each of the independent subimages and then each eigenvector is converted to a feature vector. The feature vectors are combined to create a resultant feature matrix. The $l_2$-norm is determined for each row in the resultant feature matrix and then the resultant feature matrix is converted to a resultant feature vector using the $l_2$-norms.

In another embodiment, a computer executed method for facial recognition comprises three phases—preprocessing, feature extraction and recognition. Preprocessing is performed after receipt of a face image. Preprocessing may comprise converting an image dimension of the face image to a common dimension, which may be of size N×N and in which N may be of the power two, and converting the face image from a first datatype to a second datatype, which may be the double datatype. After preprocessing, feature extraction begins. During feature extraction the 2D DMWT is applied to the preprocessed face image to obtain a resultant image matrix for the face image. The resultant image matrix has a plurality of subimages, which may be four subimages. The plurality of subimages are used to determine a resultant feature vector. Recognition of the resultant feature vector is then performed, which may be done using a neural network.

The resultant feature vector may be determined using eigenvalues. To do this, an eigenvalue is determined for each of the subimages and then the eigenvalues are combined to obtain a resultant feature matrix. The resultant feature matrix is then converted to a resultant feature vector.

Alternatively, the resultant feature vector may be determined using eigenvectors. To do this, an eigenvector is determined for each of the subimages and then each eigenvector is converted to a feature vector. The feature vectors are combined to create a resultant feature matrix. The $l_2$-norm is determined for each row in the resultant feature matrix and then the resultant feature matrix is converted to a resultant feature vector using the $l_2$-norms.

In a further embodiment, a computer executed method for facial recognition comprises three phases—preprocessing, feature extraction and recognition. Preprocessing is performed after receipt of a face image. Preprocessing may comprise dividing the face image into a plurality of subimages (which may be four subimages), converting the image dimension of the subimages to a common dimension, which may be of size N×N and in which N may be of the power two, and converting the subimages from a first datatype to a second datatype, which may be the double datatype. After preprocessing, feature extraction begins. During feature extraction the 2D DMWT is applied to the preprocessed subimages to obtain a resultant subimage matrix for each subimage. Each resultant image matrix has a plurality of sub-subimages (which may be four subimages). Each sub-subimage is then converted into a vector thereby creating a vector corresponding with each sub-subimage. The vectors corresponding to each subimage are then combined to create a pose matrix. The pose matrix is used to determine a resultant feature vector. Recognition of the resultant feature vector is then performed, which may be done using a neural network.

The resultant feature vector may be determined using FastICA and the $l_2$-norm. To do this, 2D FastICA is applied to the pose matrix to obtain a FastICA matrix. The FastICA matrix may be a FastICA signal matrix, a mixing matrix of a FastICA signal matrix or a feature matrix of a FastICA signal matrix. The $l_2$-norm is determined for each row in the FastICA matrix and then the FastICA matrix is converted to a resultant feature vector using the $l_2$-norms.

Alternatively, the resultant feature vector may be determined using the $l_2$-norm. To do this, the $l_2$-norm is determined for each row in the pose matrix and then the pose matrix is converted to a resultant feature vector using the $l_2$-norms.

In a yet further embodiment, a computer executed method for facial recognition comprises three phases—preprocessing, feature extraction and recognition. Preprocessing is performed after receipt of a face image. Preprocessing may comprise dividing the face image into a plurality of subimages (which may be four subimages), converting the image dimension of the subimages to a common dimension, which may be of size N×N and in which N may be of the power 2, and converting the subimages from a first datatype to a second datatype, which may be the double datatype. After preprocessing, feature extraction begins. During feature extraction the 2D DMWT is applied to the preprocessed subimages to obtain a resultant subimage matrix for each subimage. Each resultant image matrix has a plurality of sub-subimages (which may be four subimages). Each sub-subimage is then converted into a vector thereby creating a vector corresponding with each sub-subimage. The vectors corresponding to each set of four sub-subimages are then combined to create a pose matrix. The pose matrices are used to determine resultant feature vectors. Recognition of the resultant feature vectors is then performed, which may be done using a neural network.

The resultant feature vectors may be determined using FastICA and the $l_2$-norm. To do this, 2D FastICA is applied to the pose matrices to obtain a FastICA matrix. The FastICA matrices may be FastICA signal matrices, mixing matrices of FastICA signal matrices or feature matrices of FastICA signal matrices. The $l_2$-norm is determined for each row in each of the FastICA matrices and then the FastICA matrices are each converted to a resultant feature vector using the $l_2$-norms.

Alternatively, the resultant feature vectors may be determined using the $l_2$-norm. To do this, the $l_2$-norm is determined for each row in each of the pose matrix and then each of the pose matrices are converted to a resultant feature vector using the $l_2$-norms.

BRIEF DESCRIPTION OF THE DRAWINGS

FIG. 1A is a block diagram illustrating an exemplary system upon which embodiments of the facial recognition method may be executed according to an embodiment of the present invention.

FIG. 1B is a flowchart of a prepossessing method according to an embodiment of the present invention.

FIG. 2 is a table of the dimensions of the face images in the ORL, YALE and FERET databases and the common dimension used for face images in embodiments of the present invention.

FIGS. 9A-9D are images of four exemplary subimages of a face image from the FERET database created during the alternative preprocessing method shown in FIG. 8 according to an embodiment of the present invention.

FIG. 10 is a table of the dimensions of exemplary subimages created from a face image having dimension M×R and the new (or common) dimension N×N used as an exemplary dimension for subimages in embodiments of the present invention.

FIGS. 13A-13D are diagrams illustrating the conversion of the exemplary sub-subimages of FIG. 12A-12D, respectively, into one dimensional form according to an embodiment of the present invention.

FIG. 15 is a table of exemplary experimental results and resultant matrix dimensions for the ORL database according to an embodiment of the present invention.

FIG. 16 is a table of exemplary experimental results and resultant matrix dimensions for the YALE database according to an embodiment of the present invention.

FIG. 17 is a table of exemplary experimental results and resultant matrix dimensions for the FERET database according to an embodiment of the present invention.

DETAILED DESCRIPTION OF THE PREFERRED EMBODIMENTS

Figure 3A:
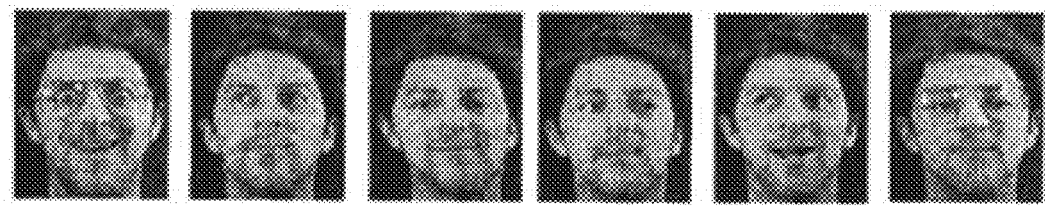
FIGS. 3A-3C are exemplary face images from the ORL (3A), YALE (3B) and FERET (3C) databases.
Figure 3A:
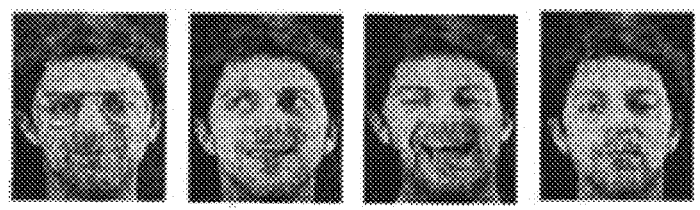
Figure 3B:
Figure 3B:
Figure 3C:
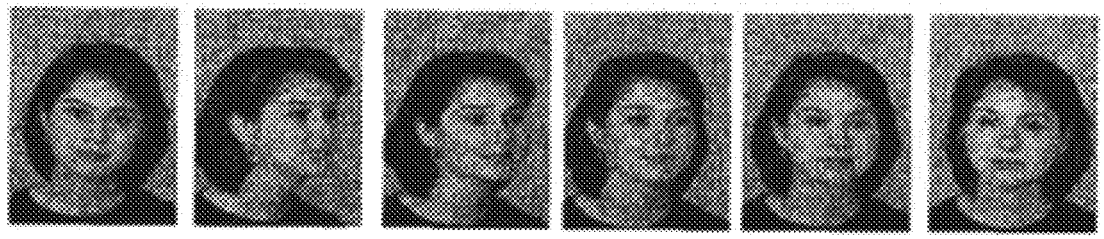
Figure 3C:
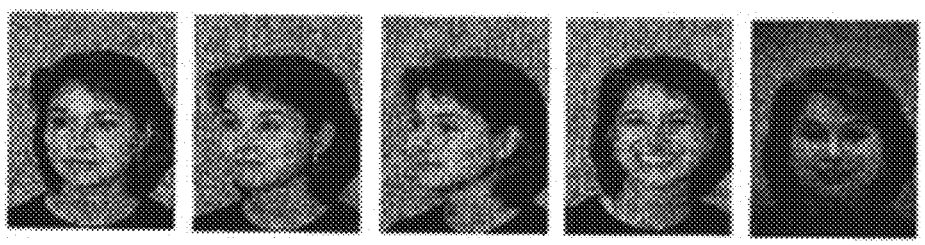

A detailed description of the embodiments for methods and systems of supervised-learning facial recognition using multiresolution and independent features will now be presented with reference to FIGS. 1-17 One of skill in the art will recognize that these embodiments are not intended to be limitations on the scope, and that modifications are possible without departing from the spirit thereof. In certain instances, well-known methods, procedures, components, and circuits have not been described in detail.

FIG. 1A is a diagram of an exemplary system. It should be understood, however, that a system as illustrated and hereinafter described is merely illustrative of a system that could benefit from embodiments of the invention, and therefore, should not be taken to limit the scope of the invention. While an embodiment of the system is illustrated for purposes of example, other configuration of systems may readily employ embodiments of the invention. The exemplary system may comprise sensor 108, which may be a camera or other imaging device, and electronic device 107 (e.g. a computer or server). Sensor 108 produces image 106, which may be a face image or an image that includes a face image. Image 106 may be cropped and sized to only include a face image. Sensor 108 outputs image 106 to electronic device 107, which performs facial recognition on image 106 and presents the results to the user, which may be, for example, the identity of the unknown face in image 106 or a match or non-match notification.

Electronic device 107 may include or be in communication with database 110. During training and testing of embodiments of the facial recognition method, face images 109 may come from database 110.

Electronic device 107 may be a mobile computing device. Electronic device 107 may comprise a user interface for providing output and/or receiving input. Electronic device 107 may comprise an output device such as a display which is coupled to a processor. The user input interface, which allows electronic device 107 to receive data, may comprise means, such as one or more devices that may allow electronic device 107 to receive data, such as a keypad, a touch display, for example if the display comprises touch capability, and/or the like.

Electronic device 107 may comprise a memory device including, in one embodiment, volatile memory, such as volatile Random Access Memory (RAM) including a cache area for the temporary storage of data. Electronic device 107 may also comprise other memory, for example, non-volatile memory, which may be embedded and/or may be removable. The non-volatile memory may comprise an EEPROM, flash memory or the like. The memories may store any of a number of pieces of information, and data. The information and data may be used by electronic device 107 to implement one or more functions of the electronic device.

Electronic device 107 can be connected by conventional access hardware to the sensor via a wired or wireless connection. Electronic device 107 can be connected by conventional access hardware to the Internet. Electronic device 107 and sensor 108 may be in bi-directional communication with each other via the Internet.

Electronic device 107 of an exemplary embodiment need not be the entire electronic device, but may be a component or group of components of the electronic device in other exemplary embodiments. Electronic device 107 may comprise a processor or other processing circuitry. As used in this application, the term 'circuitry' refers to at least all of the following: hardware-only implementations (such as implementations in only analog and/or digital circuitry) and to combinations of circuits and software and/or firmware such as to a combination of processors or portions of processors/software including digital signal processor(s), software, and memory(ies) that work together to cause an apparatus, such as a computer, to perform various functions and to circuits, such as a microprocessor(s) or portion of a microprocessor(s), that require software or firmware for operation, even if the software or firmware is not physically present. This definition of 'circuitry' applies to all uses of this term in this application, including in any claims. As a further example, as used in this application, the term "circuitry" would also cover an implementation of merely a processor, multiple processors, or portion of a processor and its (or their) accompanying software and/or firmware.

Further, the processor(s) may comprise functionality to operate one or more software programs, which may be stored in memory and which may, among other things, cause the processor to implement at least one embodiment including, for example, one or more of the functions or operations described herein.

Embodiments of the facial recognition method comprise three phases: preprocessing, feature extraction and recognition. In embodiments, as shown in FIG. 1B, preprocessing (method 1) begins when face images 5 are received in operation 6. Face images 5 may come from one or more databases (in the case of training and/or testing the system) or may be images from another source, for example, a camera or scanning device. The images may have various dimensions or be of a dimension that is not acceptable for processing by the method. Therefore, after the method receives the face images, in operation 7, the dimensions of face images 5 are converted to a single (or common) dimension. In the exemplary embodiments described herein, the common dimension is an N×N dimension where N is a power of two (e.g. 128×128). Although other dimensions can be used, for simplicity, examples given herein are based on an N×N dimension. The dimensions of exemplary databases having varying dimension, the ORL, YALE and FERET databases, are shown in the table of FIG. 2 along with the common dimension used herein. Once the face images all have the same (or common) dimension, the face images are each converted to a datatype suitable for the transform used in operation 8. In this case, the double datatype is used resulting in a N×N double (e.g. 128×128) extension.

Embodiments of the facial recognition methods were trained and tested using the ORL, YALE and FERET databases, which have a large number of poses and persons and different light conditions, facial expressions and angle rotations. The variation in the number of poses, facial expressions, light conditions and angle rotations of these databases can be seen in FIGS. 3A (ORL), 3B (YALE) and 3C (FERET) in which face images for one person were selected for each respective database. Face images from these databases are used herein as example input to embodiments of methods described herein.

A face image has highly redundant information and large dimensions. For feature extraction, techniques can be applied to get an efficient representation of the images by extracting discriminating and independent features. Exemplary methods for feature extraction, including use of the 2D DMWT, FastICA, the $l_2$-norm and/or eigendecomposition, to obtain discriminating and independent features, are described in further detail below.

The 2D DMWT based on MRA can be used for dimensionality reduction, localizing all the useful information in one single band, and/or noise reduction. 2D FastICA can be used for decorrelating the high order statistics since most of the important information is contained in the high order statistics of the image and/or reducing the computational complexity and improving the convergence rate. ICA features may be less sensitive to the facial variations arising from different facial expressions and different poses. ICA features are independent which may lead to a better representation and, hence, better identification and recognition rates.

Figure 4A:
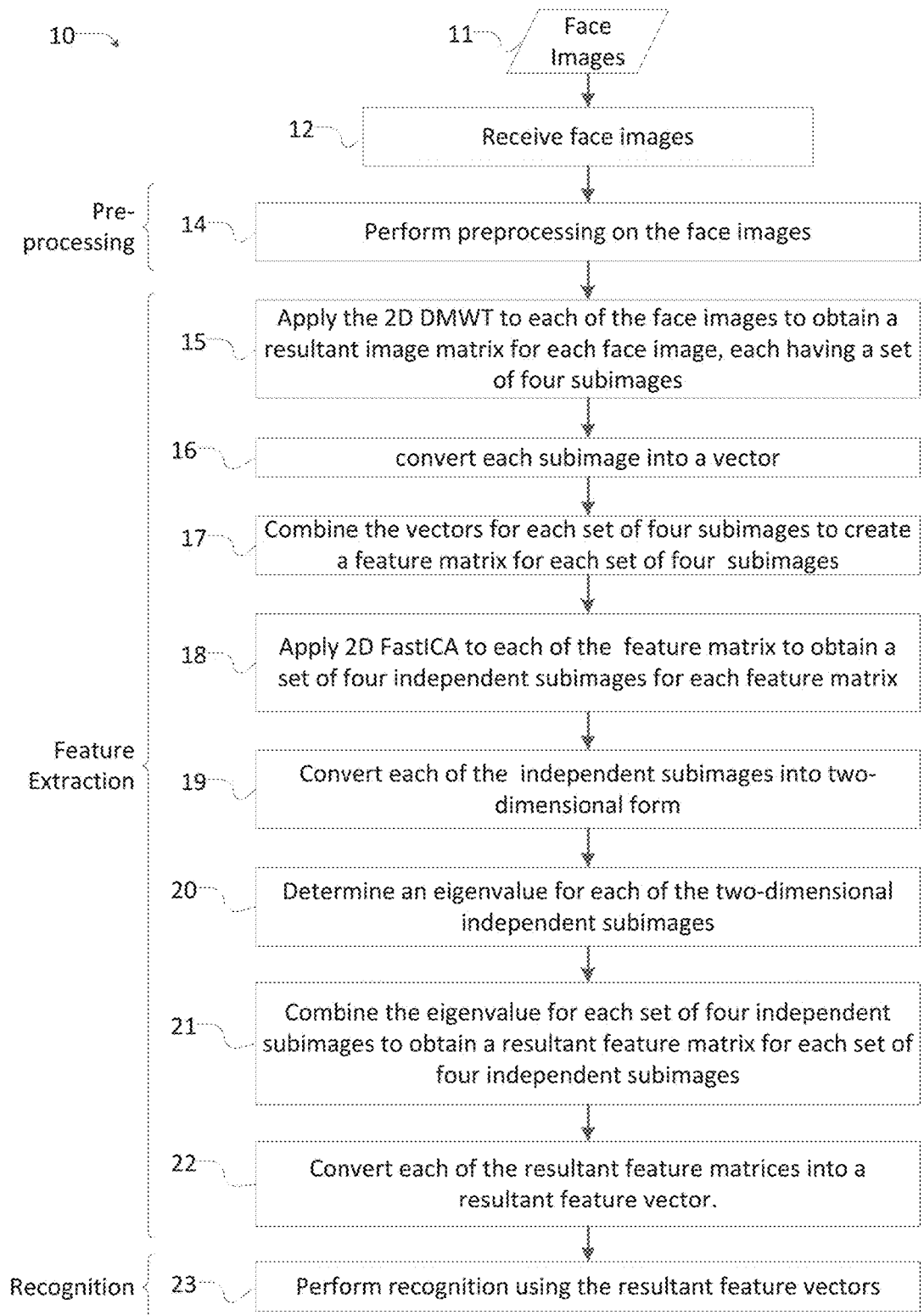
FIG. 4A is a flowchart of a facial recognition method using the 2D DMWT, 2D Fast ICA and eigendecomposition (eigenvalues) according to an embodiment of the present invention.
Figure 5A:
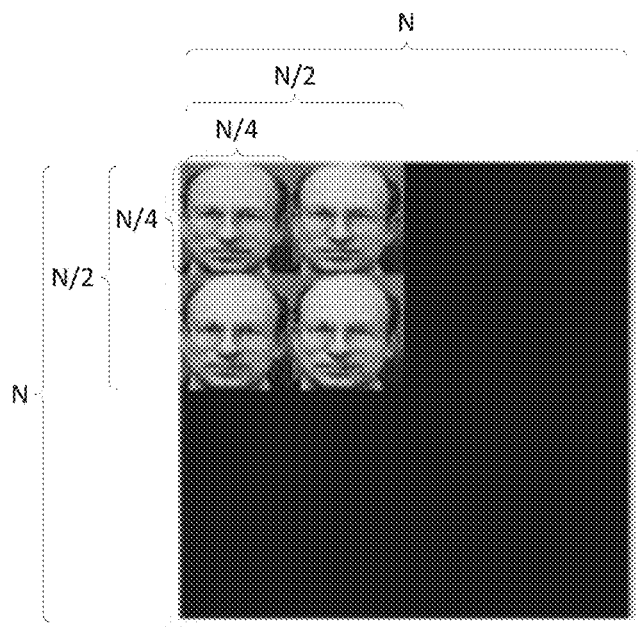
FIGS. 5A-5C are images of exemplary applications of the 2D DMWT applied to different databases—ORL (5A), YALE (5B) and FERET (5C)—according to embodiments of the present invention.
Figure 5B:
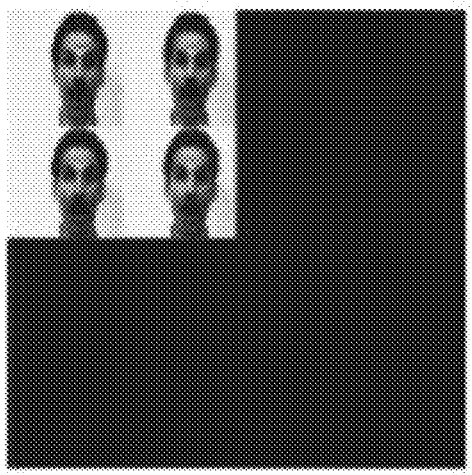
Figure 5C:
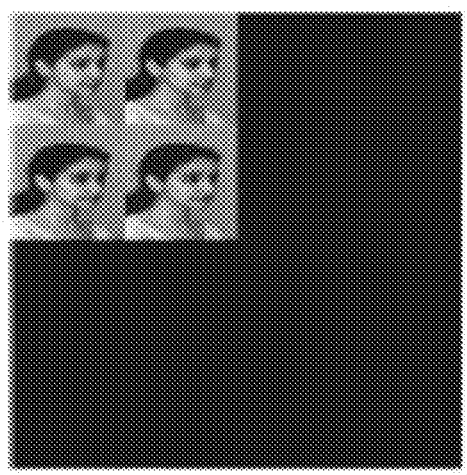

In an embodiment, illustrated in the flowchart of FIG. 4A, facial recognition method 10 uses 2D DMWT, FastICA and eigendecomposition. As shown, face images 11 are received in operation 12. In operation 14, preprocessing, which may be preprocessing method 1, is performed on face images 11. In operation 15, the 2D DMWT is applied to each of the preprocessed face images. This produces a resultant image matrix for each face image. In the resultant image matrix, each face image has a set of subimages. FIGS. 5A-5C provide examples of applying the 2D DMWT to face images from the ORL, YALE, and FERET databases, respectively. As shown in FIGS. 5A-5C, the images are divided into four main sub-bands with dimension $$\frac{N}{2} \times \frac{N}{2}$$

(e.g. 64×64) and each one is further divided into four $$\frac{N}{4} \times \frac{N}{4}$$

(e.g. 32×32) subimages. As can be seen, all of the useful information is localized in the upper left band, which corresponds to the low-low (LL) frequency band of the multiwavelet transform. The LL sub-band is retained, while the remaining sub-bands are eliminated. Therefore, the resultant image matrix in this example is $$\frac{N}{2} \times \frac{N}{2}$$

(e.g. 64×64). Returning to the flowchart of FIG. 4A, once the resultant image matrix (with its subimages) has been obtained using 2D DMWT, each of the $$\frac{N}{4} \times \frac{N}{4}$$

(e.g. 32×32) subimages is converted to a $$\frac{N^2}{16} \times 1$$

(e.g. 1024×1) vector in operation 16, thereby creating a vector corresponding to each subimage (and four vectors corresponding to each image).

Next, in operation 17, the $$\frac{N^2}{16} \times 1$$

vectors for each set of four subimages are combined to create a feature matrix each having dimension $$\frac{N^2}{16} \times 4$$

(e.g. 1024×4). Each feature matrix corresponds to a set of four $$\frac{N}{4} \times \frac{N}{4}$$

subimages. 2D Fast ICA is applied, in operation 18, to each of the $$\frac{N^2}{16} \times 4$$

feature matrices to obtain a set of four $$\frac{N}{4} \times 1$$

Figure 6:
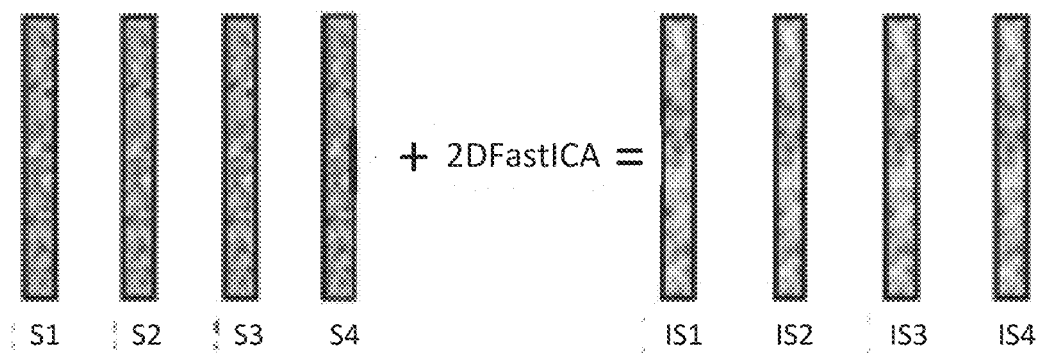
FIG. 6 is a diagram showing the application of 2D FastICA to extracted subimages (S1, S2, S3 and S4) of the low-low (LL) sub-band to obtain independent subimages (IS1, IS2, IS3, IS4, respectively) of the LL sub-band according to an embodiment of the present invention.

(e.g. 32×1) independent subimages for each feature matrix. An example of the application of 2D Fast ICA is shown in FIG. 6. As shown FastICA is applied to extracted subimages S1, S2, S3, and S4 of the LL sub-band, resulting in independent subimages IS1, IS2, IS3 and IS4 of the LL sub-band. Returning to FIG. 4A, once the independent subimages have been obtained, they are converted to two-dimensional form in operation 19.

Next, new features are extracted from the original features. In operation 20, the eigenvalues are determined for each of the independent subimages. The eigenvalues for each set of four independent subimages are then combined in operation 21 to obtain a resultant feature matrix having dimension $$\frac{N}{4} \times 4$$

(e.g. 32×4). Then, in operation 22, each of the resultant feature matrices is converted into one dimensional form into a N×1 (e.g. 128×1) resultant feature vector. Recognition is then performed, in operation 23, using the resultant feature vectors.

In the recognition phase, one of several methods can be used to identify the unknown image including, for example, by measuring the Euclidean distance, which may be done using a neural network toolbox (NNT) based classifier for training and testing. Training and testing can also be done using the Back Propagation Training Algorithm (BPTA), Raidal Bias Function or Kohonen Self Organizing Networks based classifiers.

Figure 4B:
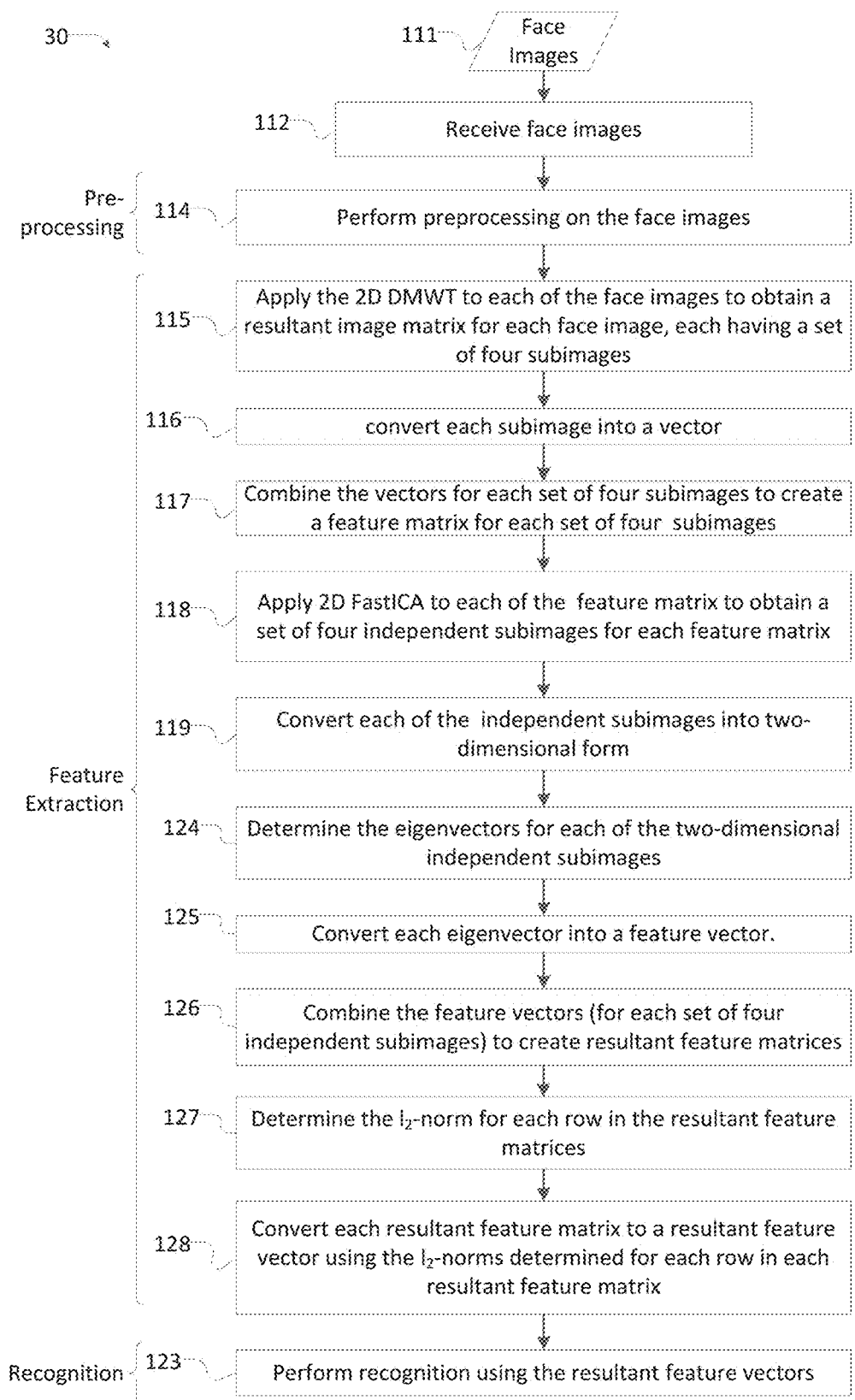
FIG. 4B is a flowchart of a facial recognition method using the 2D DMWT, 2D Fast ICA and eigendecomposition (eigenvectors) according to an embodiment of the present invention.

Alternatively, as shown in FIG. 4B, facial recognition method 30 uses eigenvectors to extract features rather than eigenvalues. As shown, face images 111 are received in operation 112. In operation 114, preprocessing, which may be preprocessing method 1 is performed on face images 111. In operation 115, the 2D DMWT is applied to each of the preprocessed face images. This produces a resultant image matrix for each face image. In the resultant image matrix, each face image has a set of subimages. As described above, FIGS. 5A-5C provide examples of applying the 2D DMWT to face images from the ORL, YALE, and FERET databases, respectively. Once the resultant image matrix (with its subimages) has been obtained using 2D DMWT, each of the $$\frac{N}{4} \times \frac{N}{4}$$

(e.g. 32×32) subimages is converted to a $$\frac{N^2}{16} \times 1$$

(e.g. 1024×1) vector in operation 116, thereby creating a vector corresponding to each subimage (and four vectors corresponding to each image).

Next, in operation 117, the $$\frac{N^2}{16} \times 1$$

vectors for each set of four subimages are combined to create a feature matrix each having dimension $$\frac{N^2}{16} \times 4$$

(e.g. 1024×4). Each feature matrix corresponds to a set of four $$\frac{N}{4} \times \frac{N}{4}$$

subimages. 2D Fast ICA is applied, in operation 118, to each of the $$\frac{N^2}{16} \times 4$$

feature matrices to obtain a set of four $$\frac{N}{4} \times 1$$

(e.g. 32×1) independent subimages for each feature matrix. As described above, an example of the application of 2D Fast ICA is shown in FIG. 6. Once the independent subimages have been obtained, they are converted to two-dimensional form in operation 119.

Next, new features are extracted from the original features. In operation 124, eigenvectors for each of the independent subimages are determined. The eigenvectors have dimension $$\frac{N}{4} \times \frac{N}{4}$$

(e.g. 32×32). Then, in operation 125, each eigenvector is converted into a feature vector having dimension $$\frac{N^2}{16} \times 1$$

(e.g. 1024×1). The feature vectors for each set of four independent subimages are then combined, in operation 126 to create a resultant feature matrix having dimension $$\frac{N^2}{16} \times 4$$

(e.g. 1024×4). In operation 127, the $l_2$-norm is determined for each row in each of the resultant feature matrices and used, in operation 128, to convert each resultant feature matrix to a resultant feature vector having dimension $$\frac{N^2}{16} \times 1$$

(e.g. 1024×1), thereby reducing the dimensionality and constraining the energy of each image in a column. Recognition is then performed, in operation 3, using the resultant feature vectors.

In the recognition phase, one of several methods can be used to identify the unknown image including, for example, by measuring the Euclidean distance, which may be done using a neural network toolbox (NNT) based classifier for training and testing. Training and testing can also be done using the Back Propagation Training Algorithm (BPTA), Raidal Bias Function or Kohonen Self Organizing Networks based classifiers.

Figure 7A:
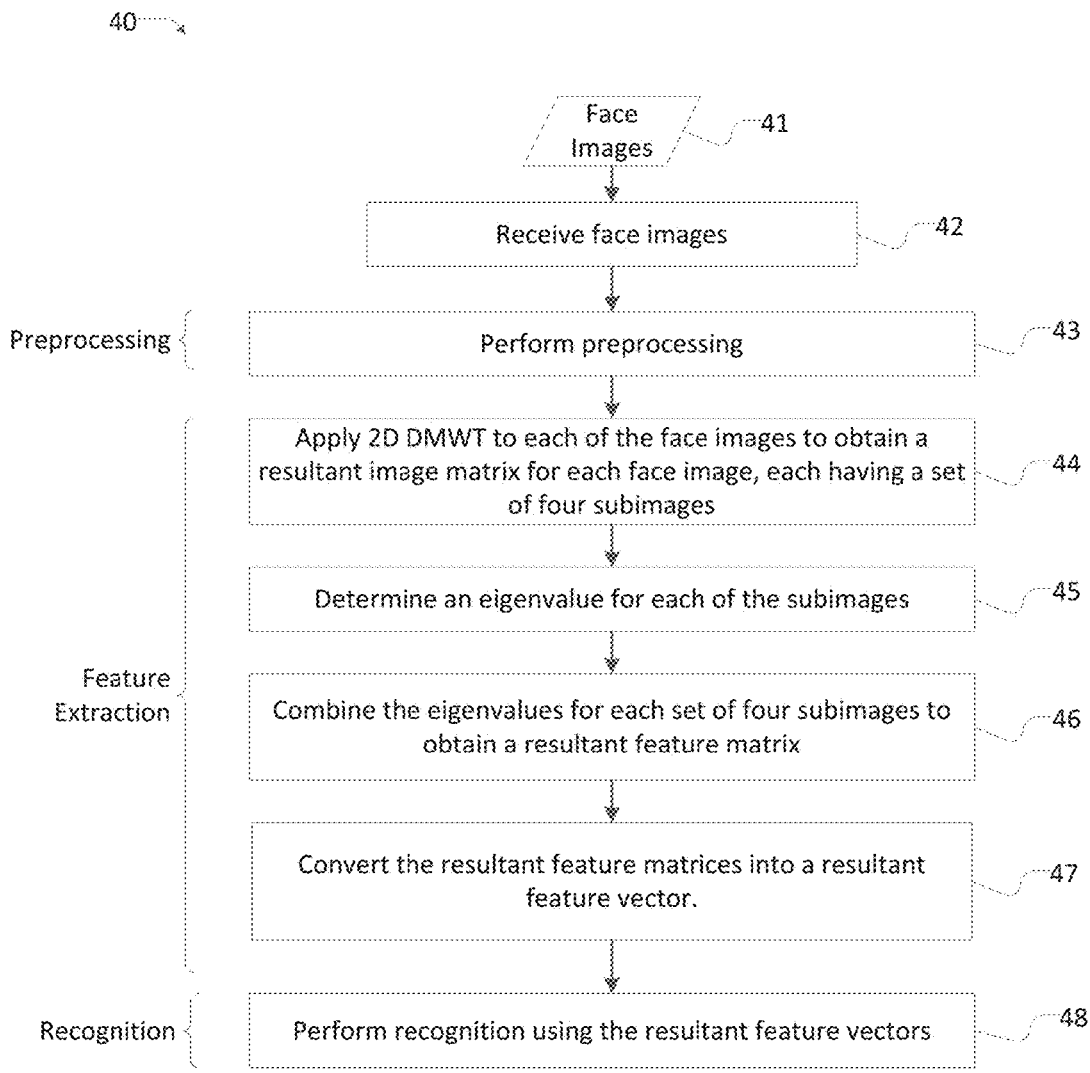
FIG. 7A is a flowchart of a facial recognition method using 2D DMWT and eigendecomposition (eigenvalues) according to an embodiment of the present invention.

In another embodiment, illustrated in the flowchart of FIG. 7A, facial recognition method 40 uses 2D DMWT and eigendecomposition (without the use of FastICA). As shown, face images 41 are received in operation 42. In operation 43, preprocessing, which may be preprocessing method 1, is performed on face images 41. In operation 44, the 2D DMWT is applied to each of the preprocessed face images. This produces a resultant image matrix for each face image. Each face image has a set of subimages. As described above, FIGS. 5A-5C provide examples of images to which the 2D DMWT has been applied. Once the resultant image matrices (with each's subimages) has been obtained using 2D DMWT, rather than applying FastICA, new features are extracted using the resultant image matrices.

In operation 45, the eigenvalues are determined for each of the $$\frac{N}{4} \times \frac{N}{4}$$

(e.g. 32×32) subimages. The eigenvalues for each set of four subimages are then combined in operation 46 to obtain a resultant feature matrix. Then, in operation 47, each of the resultant feature matrices is converted into one dimensional form into a N×1 (e.g. 128×1) resultant feature vector. Recognition is then performed, in operation 48, using the resultant feature vectors.

Figure 7B:
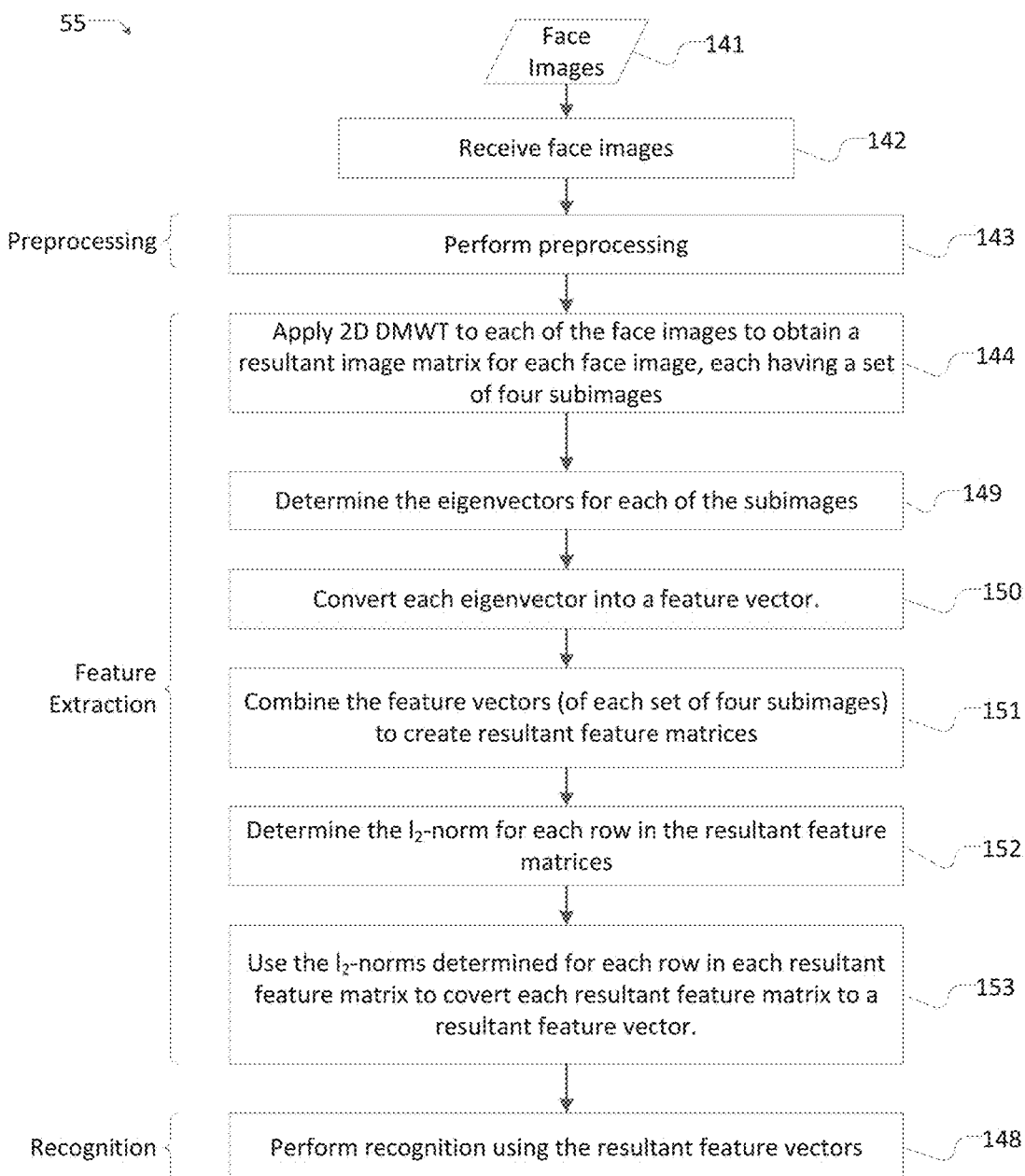
FIG. 7B is a flowchart of a facial recognition method using 2D DMWT and eigendecomposition (eigenvectors) according to an embodiment of the present invention.

Alternatively, as shown in FIG. 7B, facial recognition method 55 uses eigenvectors to extract features rather than eigenvalues. As shown, face images 141 are received in operation 142. In operation 143, preprocessing, which may be preprocessing method 1, is performed on face images 141. In operation 144, the 2D DMWT is applied to each of the preprocessed face images. This produces a resultant image matrix for each face image. Each face image has a set of subimages. As described above, FIGS. 5A-5C provide examples of images to which the 2D DMWT has been applied. Once the resultant image matrices (with each's subimages) has been obtained using 2D DMWT, new features are extracted using the resultant image matrices.

In operation 49, eigenvectors for each of the $$\frac{N}{4} \times \frac{N}{4}$$

(e.g. 32×32) subimages are determined. Then, in operation 50, each eigenvector is converted into a feature vector. The feature vectors for each set of four subimages are then combined, in operation 51, to create a resultant feature matrix. In operation 52, the $l_2$-norm is determined for each row in each of the resultant feature matrices and used, in operation 53, to convert each resultant feature matrix to a resultant feature vector having dimension $$\frac{N^2}{16} \times 1$$

(e.g. 1024×1), thereby reducing the dimensionality and constraining the energy of each image in a column. Recognition is then performed, in operation 48 using the resultant feature vectors.

Figure 8:
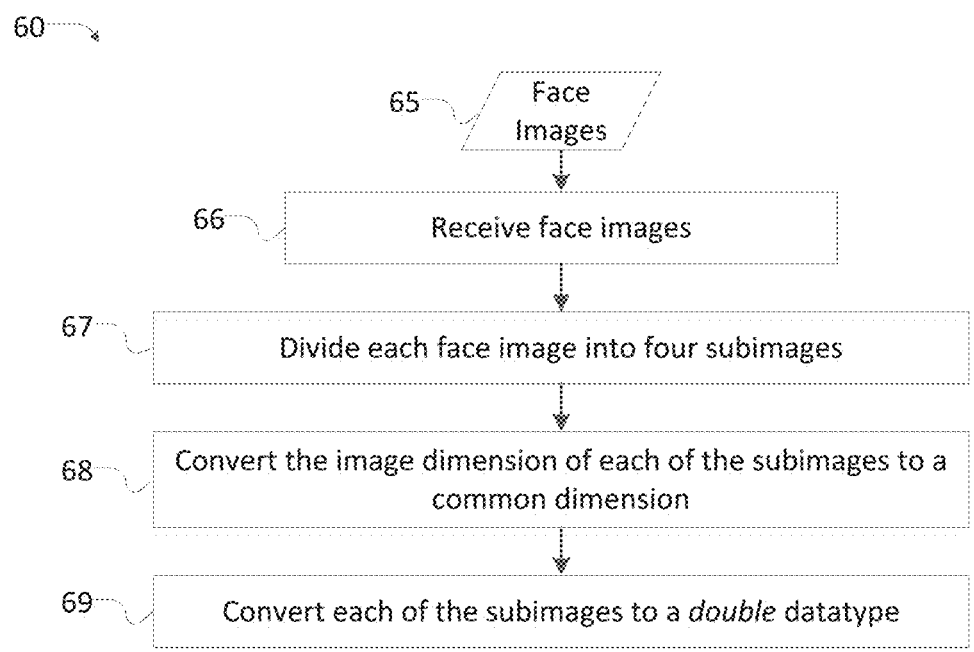
FIG. 8 is a flowchart of an alternative prepossessing method that divides face images into subimages according to an embodiment of the present invention.

In another exemplary embodiment, as shown in FIG. 8, preprocessing (method 60) may begin when face images 65 are received in operation 66. Face images 65 are then divided into subimages (or subposes) in operation 67 as illustrated in FIGS. 9A-9D. Face images 65 may come from one or more databases (in the case of training and/or testing the system) or may be images from another source, for example, a camera or scanning device. Face images 65 may have various dimensions or be of a dimension that is not acceptable for processing by the method. Even if face images 65 are of the same dimension, after the division process in operation 67, the subimages will not likely be of the same dimension, as illustrated in the table of FIG. 10, or a dimension acceptable for processing by the method. Therefore, after the method divides face images 65 into subimages, in operation 68, the dimensions of the subimages are converted to a single (or common) dimension. In the exemplary embodiments described below, the common dimension is an N×N dimension where N is a power of two (e.g. 128×128). Although other dimensions can be used, for simplicity, examples given herein are based on N×N dimensions. Once the subimages all have the same (or common) dimension, the face images are each converted to a datatype suitable for the transform used in operation 69. In this case, the double datatype is used resulting in a N×N double (e.g. 128×128) extension.

Figure 11A:
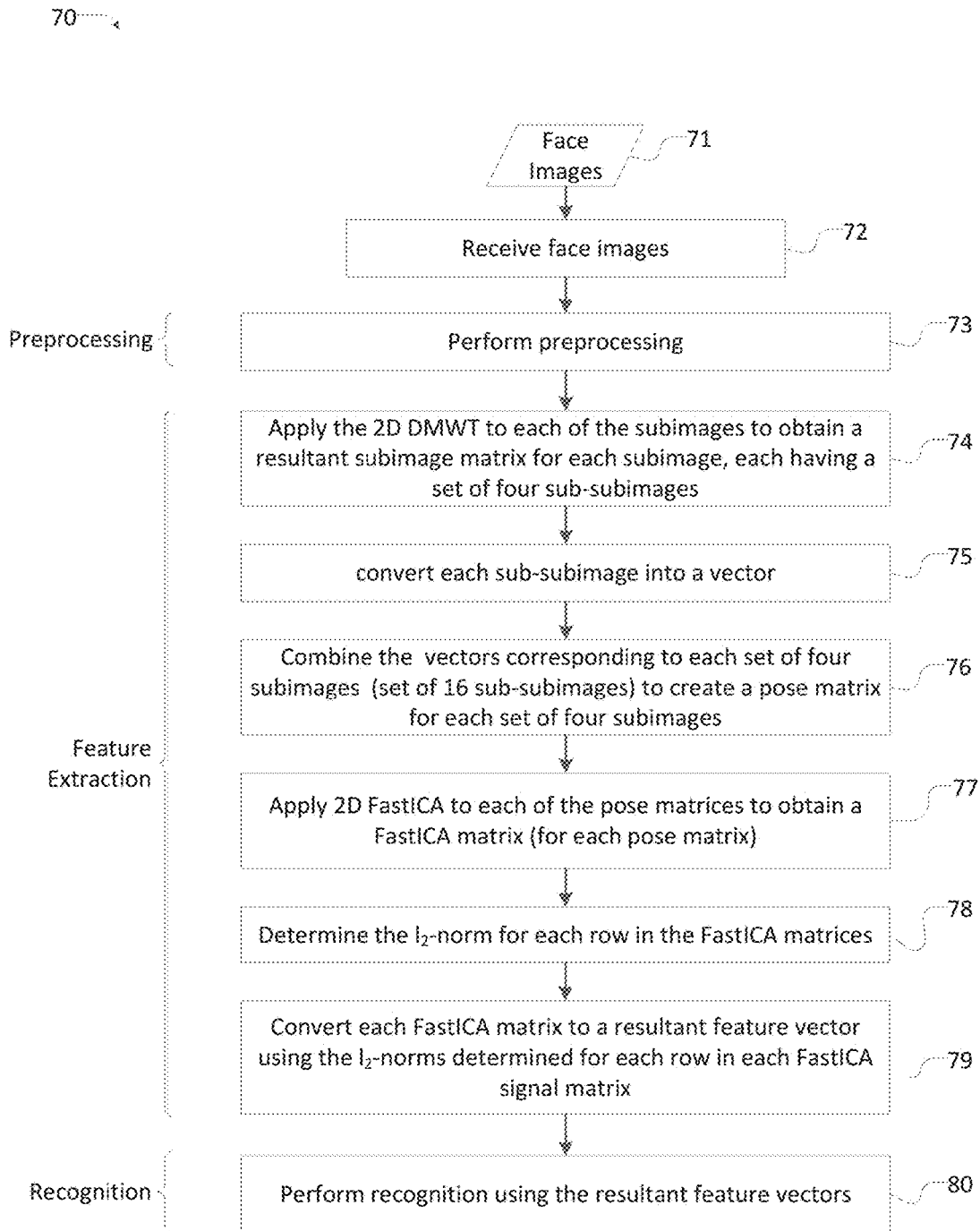
FIG. 11A is a flowchart of a facial recognition method that uses the 2D DMWT, FastICA and the $l_2$-norm to process subimages (as opposed to face images) during the feature extraction phase according to an embodiment of the present invention.

In an embodiment, illustrated in the flowchart of FIG. 11A, facial recognition method 70 uses 2D DMWT, FastICA and the $l_2$-norm. As shown, face images 71 are received in operation 72. In operation 73, preprocessing, which may be preprocessing method 60, is performed on face images 71. In operation 74, the 2D DMWT is applied to each of the subimages. This produces a resultant subimage matrix for each subimage. Each subimage has a set of four sub-subimages. FIGS. 12A-12D illustrate an example of applying 2D DMWT to the subimages of FIGS. 9A-9D. As shown in FIGS. 12A-12D, each subimage is divided into four main sub-bands with dimension $$\frac{N}{2} \times \frac{N}{2}$$

(e.g. 64×64) and each one is further divided into four $$\frac{N}{4} \times \frac{N}{4}$$

(e.g. 32×32) sub-subimages. As can be seen in FIGS. 12A-12D, all of the useful information is localized in the upper left band, which corresponds to the LL frequency band of the multiwavelet transform. The LL sub-band is retained, while the remaining sub-bands are eliminated. Therefore, the resultant subimage matrix is $$\frac{N}{2} \times \frac{N}{2}$$

(e.g. 64×64). Returning to the flowchart of FIG. 11A, once the resultant subimage matrix (with its sub-subimages) has been obtained using 2D DMWT, each of the $$\frac{N}{4} \times \frac{N}{4}$$

sub-subimages is converted into a vector of $$\frac{N^2}{16} \times 1$$

(e.g. 1024×1) dimension in operation 75 as shown in FIG. 13A-13D. Next, in operation 76, the $$\frac{N^2}{16} \times 1$$

vectors that correspond to the subimages in each set of four subimages (for a total 16 sub-subimages, which represent all of the sub subimages that correspond to a single original face image) are combined to create a $$\frac{N^2}{16} \times 16$$

pose matrix. Each pose matrix corresponds to a set of four subimages.

2D Fast ICA is applied, in operation 77, to each of the $$\frac{N^2}{16} \times 16$$

pose matrices to obtain a FastICA matrix, which may be, for example, a FastICA signal matrix, a mixing matrix of a FastICA signal matrix or a feature matrix of a FastICA signal matrix. A FastICA matrix is created for each pose matrix. In operation 78, the $l_2$-norm is determined for each row in each of the FastICA matrices and used, in operation 79, to convert each FastICA matrix to a resultant feature vector having dimension $$\frac{N^2}{16} \times 1$$

(e.g. 1024×1), thereby reducing the dimensionality and constraining the energy of each image in a column. Recognition is then performed, in operation 80, using the resultant feature vectors.

Figure 11B:
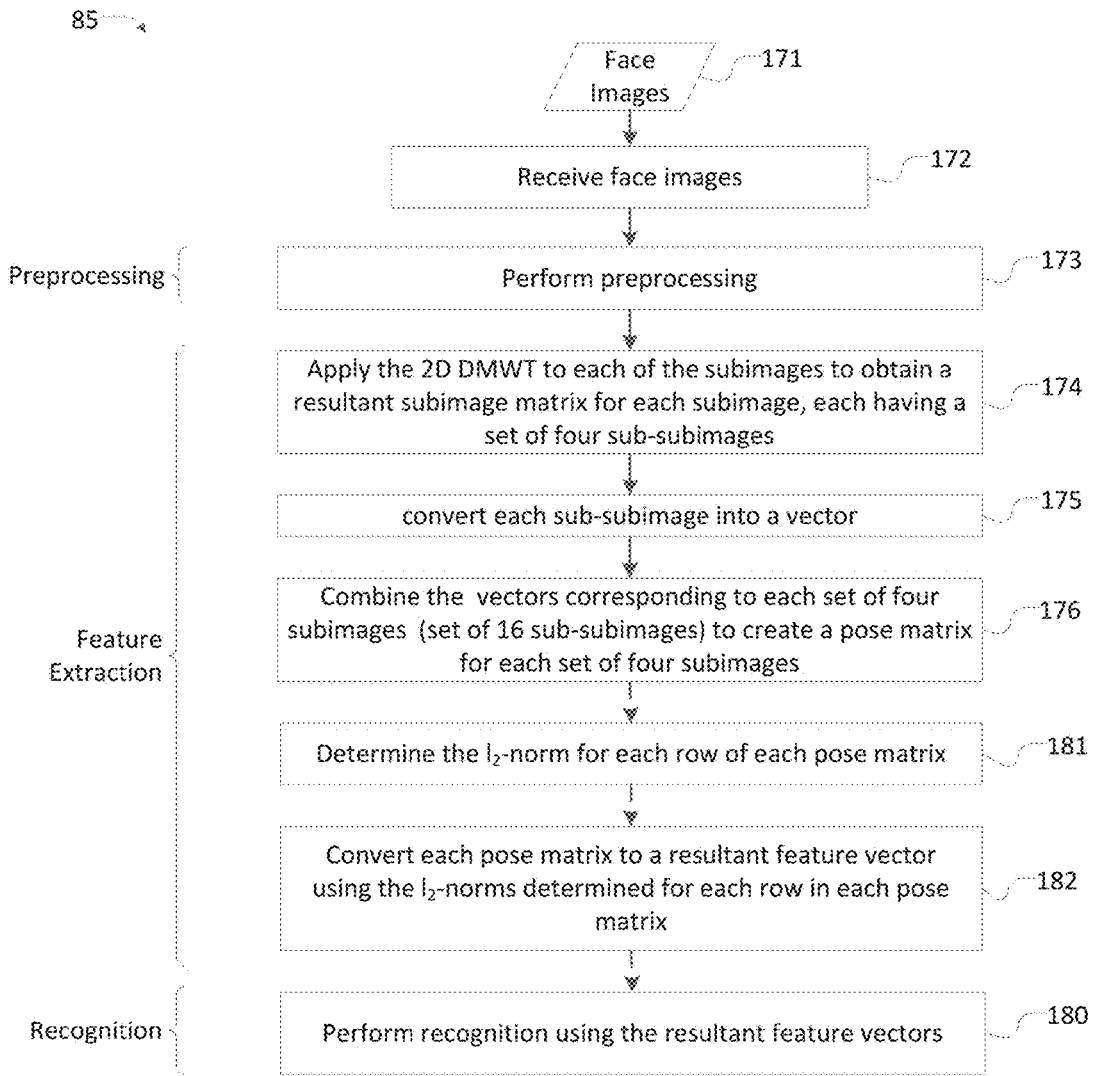
FIG. 11B is a flowchart of a facial recognition method that uses the 2D DMWT and the $l_2$-norm to process subimages (as opposed to face images) during the feature extraction phase according to an embodiment of the present invention.
Figures 12A, 12B:
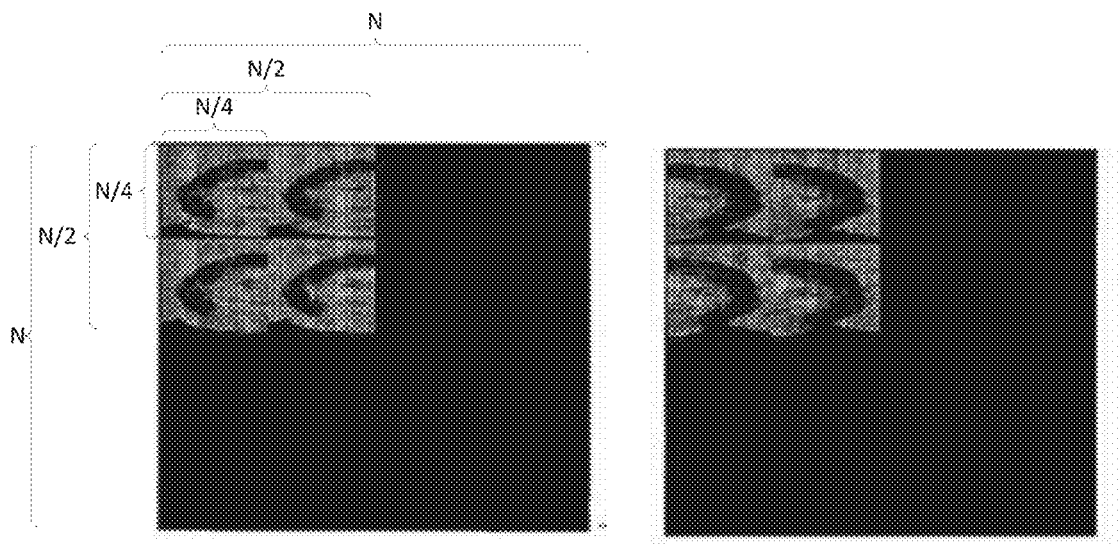
FIGS. 12A-12D are exemplary images of the sub-subimages obtained after applying the 2D DMWT to the subimages of FIGS. 9A-9D, respectively, according to an embodiment of the present invention.
Figures 12C, 12D:
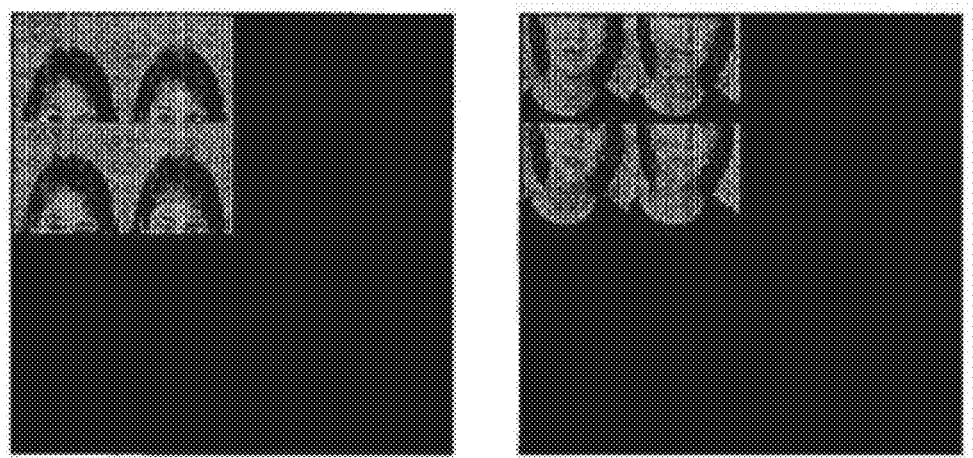

As an alternative, facial recognition method 85 extracts features without using FastICA as shown in FIG. 11B. Face images 171 are received in operation 172. In operation 173, preprocessing, which may be preprocessing method 60, is performed on face images 171. In operation 174, the 2D DMWT is applied to each of the subimages. This produces a resultant subimage matrix for each subimage. Each subimage has a set of four sub-subimages. As described above, FIGS. 12A-12D illustrate an example of applying 2D DMWT to the subimages of FIGS. 9A-9D. Once the resultant subimage matrix (with its sub-subimages) has been obtained using 2D DMWT, each of the $$\frac{N}{4} \times \frac{N}{4}$$

sub-subimages is converted into a vector of $$\frac{N^2}{16} \times 1$$

(e.g. 1024×1) dimension in operation 175 as shown in FIG. 13A-13D. Next, in operation 176, the $$\frac{N^2}{16} \times 1$$

vectors that correspond to the subimages in each set of four subimages (for a total 16 sub-subimages, which represent all of the sub subimages that correspond to a single original face image) are combined to create a $$\frac{N^2}{16} \times 16$$

pose matrix. Each pose matrix corresponds to a set of four subimages. After the $$\frac{N^2}{16} \times 16$$

pose matrix is created in operation 176, $l_2$-norm is determined for each row in each of the pose matrix in operation 181. The $l_2$-norm is then used, in operation 182, to convert each pose matrix to a resultant feature vector having dimension $$\frac{N^2}{16} \times 1$$

(e.g. 1024×1). Recognition is then performed, in operation 180, using the resultant feature vectors.

Figure 14A:
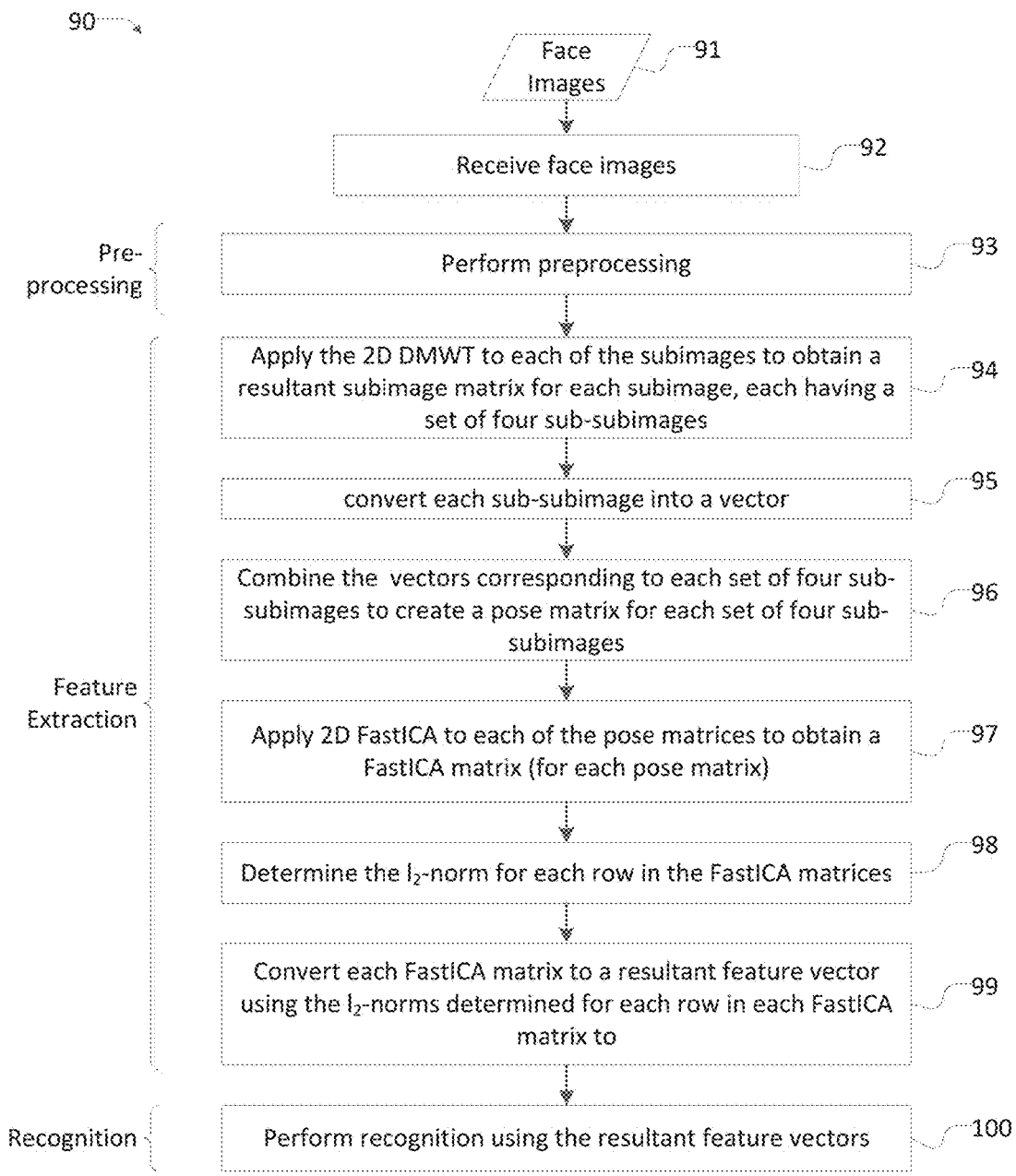
FIG. 14A is a flowchart of a facial recognition method that uses 2D DMWT, FastICA and the $l_2$-norm and an alternative formation of the pose matrix to process subimages (as opposed to face images) during the feature extraction phase according to an embodiment of the present invention.

In another embodiment, illustrated in the flowchart of FIG. 14A, face recognition method 90 uses 2D DMWT, FastICA and $l_2$-norm; however, here, FastICA is applied to each subimage (with dimension $$\frac{N^2}{16} \times 4)$$

rather than the set of four subimages (with dimension $$\frac{N^2}{16} \times 16)$$

(that correspond to a single face image). As shown in FIG. 14A, face images 91 are received in operation 92. In operation 93, preprocessing, which may be preprocessing method 60, is performed on face images 91. In operation 94, the 2D DMWT is applied to each of the subimages. This produces a resultant subimage matrix for each subimage. Each subimage has a set of four sub-subimages. FIGS. 12A-12D illustrate an example of applying 2D DMWT to the subimages of FIGS. 9A-9D. As shown in FIGS. 12A-12D and explained above, each subimage is divided into four main sub-bands with dimension $$\frac{N}{2} \times \frac{N}{2}$$

(e.g. 64×64) and each one is further divided into four $$\frac{N}{4} \times \frac{N}{4}$$

(e.g. 32×32) sub-subimages. The resultant subimage matrix is $$\frac{N}{2} \times \frac{N}{2}$$

(e.g. 64×64). Returning to the flowchart of FIG. 14A, once the resultant subimage matrix (with its sub-subimages) has been obtained using 2D DMWT, each of the $$\frac{N}{4} \times \frac{N}{4}$$

sub-subimages is converted into a vector of $$\frac{N^2}{16} \times 1$$

(e.g. 1024×1) dimension in operation 95 as shown in FIG. 13A-13D. Next, in operation 96, the $$\frac{N^2}{16} \times 1$$

vectors for each set of four sub-subimages are combined to create a $$\frac{N^2}{16} \times 4$$

pose matrix. Each pose matrix corresponds to a set of four sub-subimages.

2D Fast ICA is applied, in operation 97, to each of the $$\frac{N^2}{16} \times 4$$

pose matrices to obtain a FastICA matrix, which may be, for example, a FastICA signal matrix, a mixing matrix of a FastICA signal matrix or a feature matrix of a FastICA signal matrix. A FastICA matrix is created for each pose matrix. In operation 98, the $l_2$-norm is determined for each row in each of the FastICA matrices and used, in operation 99, to convert each FastICA matrix to a resultant feature vector having dimension $$\frac{N^2}{16} \times 1$$

(e.g. 1024×1), thereby reducing the dimensionality and constraining the energy of each image in a column. Recognition is then performed, in operation 100, using the resultant feature vectors.

Figure 14B:
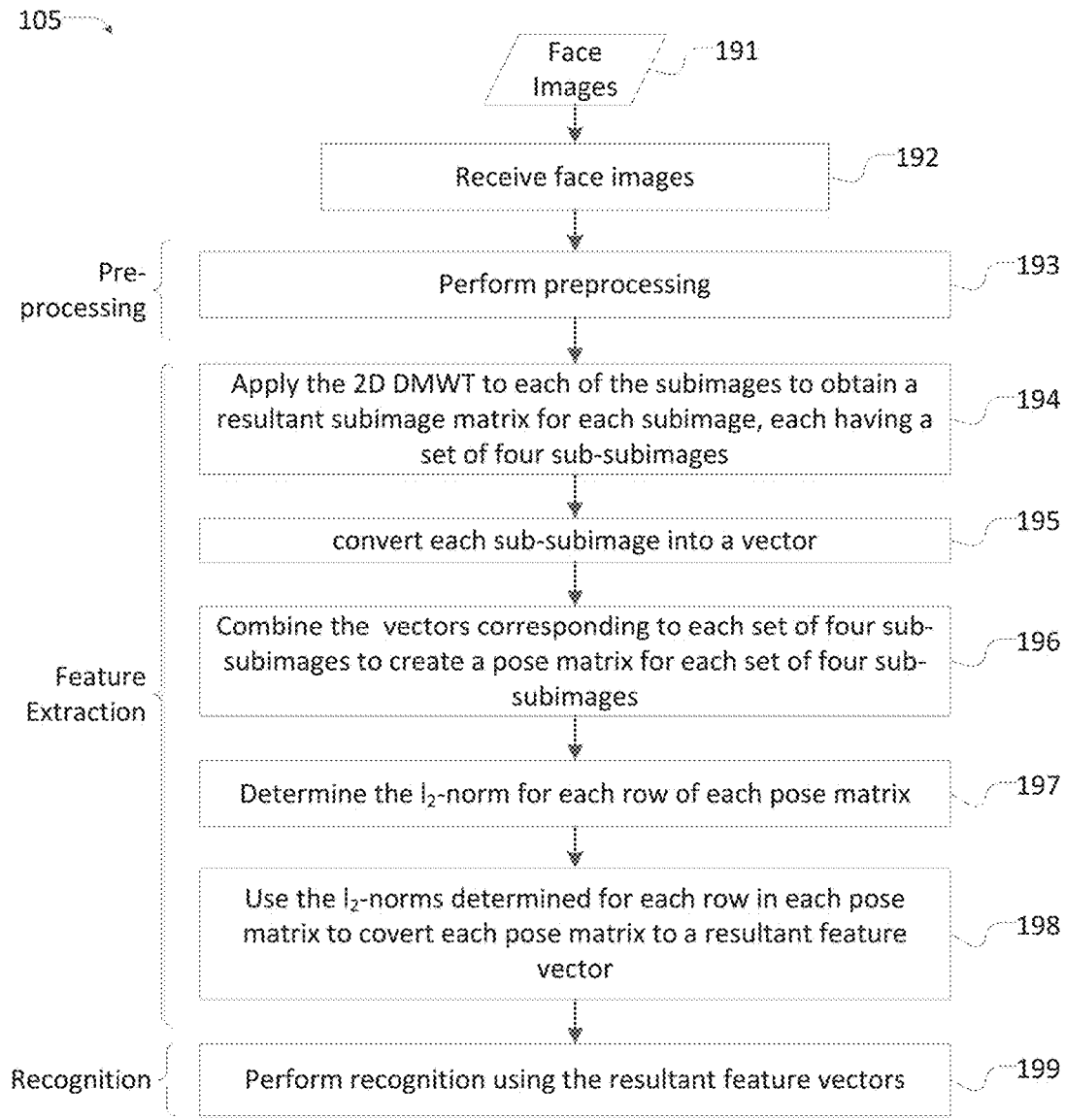
FIG. 14B is a flowchart of a facial recognition method that uses 2D DMWT and the $l_2$-norm and an alternative formation of the pose matrix to process subimages (as opposed to face images) during the feature extraction phase according to an embodiment of the present invention.

As an alternative, facial recognition method 105 extracts features without using FastICA FIG. 14B. Face images 191 are received in operation 192. In operation 193, preprocessing, which may be preprocessing method 60, is performed on face images 91. In operation 194, the 2D DMWT is applied to each of the subimages. This produces a resultant subimage matrix for each subimage. Each subimage has a set of four sub-subimages. As described above, FIGS. 12A-12D illustrate an example of applying 2D DMWT to the subimages of FIGS. 9A-9D. Once the resultant subimage matrix (with its sub-subimages) has been obtained using 2D DMWT, each of the $$\frac{N}{4} \times \frac{N}{4}$$

sub-subimages is converted into a vector of $$\frac{N^2}{16} \times 1$$

(e.g. 1024×1) dimension in operation 195 as shown in FIG. 13A-13D. Next, in operation 196, the vectors for each set of four sub-subimages are combined to create a $$\frac{N^2}{16} \times 4$$

pose matrix. Each pose matrix corresponds to a set of four sub-subimages. The $l_2$-norm is determined for each row in each of the pose matrix in operation 197. The $l_2$-norm is then used, in operation 198, to convert each pose matrix to a resultant feature vector having dimension $$\frac{N^2}{16} \times 1$$

(e.g. 1024×1). Recognition is then performed, in operation 199, using the resultant feature vectors.

In the recognition phase, a neural network based on the BPTA was used for training and testing. BPTA is a supervised learning algorithm. Therefore, it is necessary to choose a desired output for each database. ORL, YALE and FERET databases were used as an example for training and testing the recognition phase. There are 40, 15, and 200 different desired outputs for the ORL, YALE, and FERET databases, respectively, corresponding to the different number of persons in each database. Three layers are used in the NNT, namely, an input, a hidden, and an output layer.

Exemplary experimental results of various embodiments described herein are provided in FIGS. 15-17. The methods of the various embodiments were tested using ORL, YALE and FERET databases, which have different light conditions, facial expressions, angle rotation, and a large number of poses and persons. The variation in the number of persons, the number of poses, facial expressions, light conditions and angle rotations of these databases can be seen in FIGS. 3A (ORL), 3B (YALE) and 3C (FERET).

There are 40 persons in the ORL database, each with 10 different poses. Therefore, the total number of poses used to test the system is 400 poses. P denotes the number of poses used for training. Hence, 10–P poses are used for testing. P=1, P=3 and P=5 poses were used here. The table of FIG. 15 summarizes the results for the different approaches.

The YALE database consists of 15 persons, each with 11 different poses. Therefore, the total number of poses used to test the system is 165 poses. In the training phase, P=1, P=3 and P=5 poses were used. The table of FIG. 16 summarizes the results of the different approaches.

There are 200 persons in the FERET database, each with 11 different poses. Therefore, the total number of poses used to test the system is 2200 poses. In the training phase, P=1, P=3 and P=5 poses were used. The table of FIG. 17 summarizes the results of the different approaches.

Note that FastICA decorrelates the images and produces statistically independent sets of images. Then eigenanalysis of the resulting features generates an efficient image representation. The configuration of the neural network during the training phase can affect the overall performance of the methods. Choosing the number of hidden layers, the number of neurons in the hidden layers, the types of the activation functions, the training function, the training method and the target performance can impact the overall performance of the system. In the exemplary results for methods 10, 30, 40 and 55, one hidden layer was used with 512 neurons for the ORL and YALE databases and two hidden layers were used with 512 and 256 neurons for first and the second hidden layer, respectively for the FERET database. In the above exemplary results for methods 70, 85, 90 and 105, one hidden layer was used with 1024 neurons for the ORL and YALE databases and two hidden layers were used with 1024 and 512 neurons for the first and second hidden layer, respectively, for the FERET database. The activation function that was used was the hyperbolic tangent sigmoid and back propagation was used for training and testing. The mean square error (MSE) was $10^{-7}$.

Having now described the invention, the construction, the operation and use of preferred embodiments thereof, and the advantageous new and useful results obtained thereby, the new and useful constructions, and reasonable mechanical equivalents thereof obvious to those skilled in the art, are set forth in the appended claims.

What is claimed is:

1. A computer executed method for facial recognition comprising:
   receiving a face image;
   performing preprocessing on the face image;
   applying a 2D DMWT to the preprocessed face image to obtain a resultant image matrix for the face image, the resultant image matrix having a plurality of subimages;
   converting each of the subimages into a vector;
   combining the vectors for each of the subimages to create a feature matrix;
   applying 2D FastICA to the feature matrix to obtain a plurality of independent subimages;
   converting the plurality of independent subimages into two-dimensional form;
   determining a resultant feature vector using the plurality of two-dimensional independent subimages; and
   performing recognition of the resultant feature vector.

2. The method of claim 1, wherein the operation of performing preprocessing on the face image comprises:
   converting an image dimension of the face image to a common dimension; and
   converting the face image from a first datatype to a second datatype.

3. The method of claim 2, wherein the common dimension is of size N×N and wherein N is of the power two.

4. The method of claim 2, wherein the second datatype is a double datatype.

5. The method of claim 1, wherein the plurality of subimages is four subimages and the plurality of independent subimages is four independent subimages.

6. The method of claim 1, wherein the operation of determining the resultant feature vector using the plurality of two-dimensional independent subimages comprises:
   determining an eigenvalue for each of the two-dimensional independent subimages;
   combining the eigenvalues to obtain a resultant feature matrix; and
   converting the resultant feature matrix into a resultant feature vector.

7. The method of claim 1, wherein the operation of determining the resultant feature vector using the plurality of two-dimensional independent subimages comprises:
   determining an eigenvector for each of the plurality of two-dimensional independent subimages;
   converting each eigenvector into a feature vector;
   combining the feature vectors to create a resultant feature matrix;

determining a $l_2$-norm for each row in the resultant feature matrix; and convert the resultant feature matrix to the resultant feature vector using the $l_2$-norms.

8. The method of claim 1, wherein the operation of performing recognition of the resultant feature vector comprises:

identifying the face image by using the resultant feature vector as input to a neural network.

9. A computer executed method for facial recognition comprising:

receiving a face image;

performing preprocessing on the face image, wherein said step of preprocessing comprises dividing the face image into subimages, converting each of said subimages to a common dimension, and converting the face image to a datatype suitable for transform using 2D DMWT;

applying a 2D DMWT to the preprocessed face image to obtain a resultant image matrix for the face image, the resultant image matrix having a plurality of subimages;

determining a resultant feature vector using the plurality of subimages; and performing recognition of the resultant feature vector.

10. The method of claim 9, wherein the operation of performing preprocessing on the face image comprises:

converting an image dimension of the face image to a common dimension; and converting the face image from a first datatype to a second datatype.

11. The method of claim 10, wherein the common dimension is of size N×N and wherein N is of the power two.

12. The method of claim 10, wherein the second datatype is a double datatype.

13. The method of claim 9, wherein the plurality of subimages is four subimages.

14. The method of claim 9, wherein the operation of determining the resultant feature vector using the plurality of subimages comprises:

determining an eigenvalue for each of the subimages;

combining the eigenvalues to obtain a resultant feature matrix; and converting the resultant feature matrix into a resultant feature vector.

15. The method of claim 9, wherein the operation of determining the resultant feature vector using the plurality of subimages comprises:

determining an eigenvector for each of the subimages;

converting each eigenvector into a feature vector;

combining the feature vectors to create a resultant feature matrix;

determining a $l_2$-norm for each row in the resultant feature matrix; and convert the resultant feature matrix to the resultant feature vector using the $l_2$-norms.

16. The method of claim 9, wherein the operation of performing recognition of the resultant feature vector comprises:

identifying the face image by using the resultant feature vector as input to a neural network.

17. A computer executed method for facial recognition comprising:

receiving a face image;

performing preprocessing on the face image to obtain a plurality of subimages resulting in a face image of dimension N×N;

applying a 2D DMWT to the plurality of preprocessed subimages to obtain a resultant subimage matrix for each subimage, each resultant image matrix having a plurality of sub-subimages;

converting each of the sub-subimages into a vector;

combining the vectors to create a pose matrix;

determining a resultant feature vector using the pose matrix; and performing recognition of the resultant feature vector.

18. The method of claim 17, wherein the operation of performing preprocessing on the face image to obtain a plurality of subimages comprises:

dividing the face image into the plurality of subimages, wherein the plurality of subimages have an original dimension;

converting the original dimension of the plurality of subimages to a common dimension; and converting the plurality of subimages from a first datatype to a second datatype.

19. The method of claim 18, wherein the common dimension is of size N×N and wherein N is of the power two.

20. The method of claim 18, wherein the second datatype is a double datatype.

21. The method of claim 17, wherein the plurality of subimages is four subimages and the plurality of sub-subimages is four sub-subimages.

22. The method of claim 17, wherein the operation of determining the resultant feature vector using the pose matrix comprises:

applying 2D FastICA to the pose matrix to obtain a FastICA matrix;

determining a $l_2$-norm for each row in the FastICA matrix; and converting the FastICA matrix to the resultant feature vector using the $l_2$-norms.

23. The method of claim 22, wherein the FastICA matrix is a FastICA signal matrix.

24. The method of claim 22, wherein the FastICA matrix is a mixing matrix of a FastICA signal matrix.

25. The method of claim 22, wherein the FastICA matrix is a feature matrix of a FastICA signal matrix.

26. The method of claim 17, wherein the operation of determining the resultant feature vector using the pose matrix comprises:

determining a $l_2$-norm for each row in the pose matrix; and converting the pose matrix to the resultant feature vector using the $l_2$-norms.

27. The method of claim 17, wherein the operation of performing recognition of the resultant feature vector comprises:

identifying the face image by using the resultant feature vector as input to a neural network.

28. A computer executed method for facial recognition comprising:

receiving a face image;

performing preprocessing on the face image to obtain a plurality of subimages, resulting in a face image of N×N dimension;

applying a 2D DMWT to the plurality of preprocessed subimages to obtain a resultant subimage matrix for each subimage, the resultant image matrix having a plurality of sub-subimages that correspond to each of the plurality of subimages;

converting each of the plurality of sub-subimages into a plurality of vectors, wherein each vector corresponds to one of the plurality of sub-subimages;

combining the vectors that correspond to each of the subimages to create a plurality of pose matrices, wherein each pose matrix corresponds to one of the subimages;

determining a plurality of resultant feature vectors using the plurality of pose matrices; and performing recognition of the plurality of resultant feature vectors.

29. The method of claim 28, wherein the operation of performing preprocessing on the face image to obtain a plurality of subimages comprises:

dividing the face image into the plurality of subimages, wherein the plurality of subimages have an original dimension;

converting the original dimension of the plurality of subimages to a common dimension; and converting the plurality of subimages from a first datatype to a second datatype.

30. The method of claim 29, wherein the common dimension is of size N×N and wherein N is of the power two.

31. The method of claim 29, wherein the second datatype is a double datatype.

32. The method of claim 28, wherein the plurality of subimages is four subimages and the plurality of sub-subimages is four sub-subimages.

33. The method of claim 28, wherein the operation of determining the plurality of resultant feature vectors using the plurality of pose matrices comprises:

applying 2D FastICA to the pose matrices to obtain a plurality of FastICA matrices, wherein each FastICA matrix corresponds to one of the pose matrices;

determining a $l_2$-norm for each row in each of the plurality of FastICA matrices; and converting the FastICA matrices to the plurality of resultant feature vectors using the $l_2$-norms.

34. The method of claim 33, wherein the plurality of FastICA matrices are FastICA signal matrices.

35. The method of claim 33, wherein the plurality of FastICA matrices are mixing matrices from FastICA signal matrices.

36. The method of claim 33, wherein the plurality of FastICA matrices are feature matrices from FastICA signal matrices.

37. The method of claim 28, wherein the operation of determining the plurality of resultant feature vectors using the plurality of pose matrices comprises:

determining a $l_2$-norm for each row in each of the plurality of pose matrices; and converting the pose matrices to the plurality of resultant feature vectors using the $l_2$-norms.

38. The method of claim 28, wherein the operation of performing recognition of the plurality of resultant feature vector comprises:

identifying the face image by using the plurality of resultant feature vectors as input to a neural network.

* * * * *